United States Patent
Takahashi

(10) Patent No.: US 10,101,502 B2
(45) Date of Patent: Oct. 16, 2018

(54) OPTICAL PRODUCT AND SPECTACLE LENS

(71) Applicant: TOKAI OPTICAL CO., LTD., Okazaki-Shi (JP)

(72) Inventor: Hirotoshi Takahashi, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 269 days.

(21) Appl. No.: 14/994,490

(22) Filed: Jan. 13, 2016

(65) Prior Publication Data

US 2016/0124118 A1    May 5, 2016

Related U.S. Application Data

(63) Continuation of application No. PCT/JP2014/069327, filed on Jul. 22, 2014.

(30) Foreign Application Priority Data

Aug. 28, 2013   (JP) .................. 2013-176967

(51) Int. Cl.
    *G02B 1/11*     (2015.01)
    *G02C 7/10*     (2006.01)
    (Continued)

(52) U.S. Cl.
    CPC .............. *G02B 1/115* (2013.01); *G02B 5/282* (2013.01); *G02C 7/022* (2013.01); *G02C 7/10* (2013.01); *G02C 2202/16* (2013.01)

(58) Field of Classification Search
    None
    See application file for complete search history.

(56) References Cited

U.S. PATENT DOCUMENTS

| 6,250,758 B1 * | 6/2001 | Yoshihara | B32B 15/08 351/159.63 |
| 2010/0238557 A1 * | 9/2010 | Tomoda | G02B 1/111 359/586 |

(Continued)

FOREIGN PATENT DOCUMENTS

| JP | 06-222201 A1 | 8/1994 |
| JP | 2000-066149 A1 | 3/2000 |

(Continued)

OTHER PUBLICATIONS

International Search Report and Written Opinion (Application No. PCT/JP2014/069327) dated Sep. 22, 2014.

*Primary Examiner* — Darryl J Collins
(74) *Attorney, Agent, or Firm* — Burr & Brown, PLLC

(57) ABSTRACT

An optical product (spectacle lens) according to the present invention includes a base having a convex surface and a concave surface, and an optical multilayer film formed on at least the concave surface of the base. The optical multilayer film has, in total, six layers in which a first layer is closest to the base, and a layer formed of zirconium dioxide and a layer formed of silicon dioxide are alternately layered such that the first layer is the layer formed of zirconium dioxide. A physical film thickness of a fourth layer formed of silicon dioxide is greater than or equal to 10 nm and not greater than 22 nm. A sum of physical film thicknesses of the first layer formed of zirconium dioxide and a second layer formed of silicon dioxide is greater than or equal to 35 nm and not greater than 45 nm.

3 Claims, 12 Drawing Sheets

(51) Int. Cl.
*G02B 1/115* (2015.01)
*G02B 5/28* (2006.01)
*G02C 7/02* (2006.01)

(56) References Cited

U.S. PATENT DOCUMENTS

| | | | |
|---|---|---|---|
| 2011/0033635 A1* | 2/2011 | Nishimoto | B29D 11/00865 |
| | | | 427/551 |
| 2012/0019913 A1* | 1/2012 | Nishimoto | C23C 14/0057 |
| | | | 359/581 |
| 2013/0038834 A1 | 2/2013 | Cado et al. | |
| 2013/0176615 A1* | 7/2013 | Uefuji | G02B 1/113 |
| | | | 359/359 |
| 2013/0222913 A1 | 8/2013 | Tomoda et al. | |
| 2015/0198821 A1 | 7/2015 | Miyamoto et al. | |
| 2015/0234209 A1 | 8/2015 | Miyamoto et al. | |

FOREIGN PATENT DOCUMENTS

| | | |
|---|---|---|
| JP | 2013-084017 A1 | 5/2013 |
| WO | 2012/076714 A1 | 6/2012 |
| WO | 2014/050930 A1 | 4/2014 |
| WO | 2014/069250 A1 | 5/2014 |

* cited by examiner

OPTICAL PRODUCT AND SPECTACLE LENS

This application is a Continuation of International Application No. PCT/JP2014/069327, filed on Jul. 22, 2014, which claims the benefit of Japanese Patent Application Number 2013-176967 filed on Aug. 28, 2013, the disclosures of which are incorporated by reference herein in their entireties.

BACKGROUND OF INVENTION

Technical Field

The present invention relates to optical products having antireflection films that prevent reflection of ultraviolet rays, and to spectacle lenses as an example of the optical products.

Background Art

As optical multilayer films that prevent reflection of light in an ultraviolet region and a visible region, an article disclosed in International Patent Application Publication No. WO2012/076714 is known. The optical multilayer film is structured to have three to seven layers including an ITO (Indium Tin Oxide) layer having a physical film thickness of about 6.5 nanometers (nm).

SUMMARY OF THE INVENTION

In such an optical multilayer film, ITO containing indium is used. Therefore, cost may be increased for obtaining materials or performing vapor deposition.

Further, since ITO is used, transparency of a lens having the optical multilayer film may be reduced, or it may be difficult to adjust a color (color in a system) of reflected light having a low intensity, with respect to a color of the lens, in the optical multilayer film.

Therefore, an object of a first aspect of the invention is to provide an optical product and a spectacle lens which have an optical multilayer film that allows, in a simplified structure, sufficient reduction of reflectance of ultraviolet rays and visible light, and adjustment of a color of reflected light having a low intensity.

In order to attain the above object, a first aspect of the invention provides a base having a convex surface and a concave surface, and an optical multilayer film formed on at least the concave surface of the base. The optical multilayer film has, in total, six layers in which a first layer is closest to the base, and a layer formed of zirconium dioxide and a layer formed of silicon dioxide are alternately layered such that the first layer is the layer formed of zirconium dioxide. A physical film thickness of a fourth layer which is the layer formed of silicon dioxide is greater than or equal to 10 nm and not greater than 22 nm. A sum of physical film thicknesses of the first layer which is the layer formed of zirconium dioxide and a second layer which is the layer formed of silicon dioxide is greater than or equal to 35 nm and not greater than 45 nm.

According to a second aspect of the invention based on the above invention, a sum of physical film thicknesses of the first layer to the fourth layer is greater than or equal to 100 nm and not greater than 110 nm.

According to a third aspect of the invention based on the above invention, an average reflectance of light having wavelengths that are greater than or equal to 280 nm and less than 400 nm is less than or equal to 3.5% at the concave surface.

According to a fourth aspect of the invention based on the above invention, an average reflectance of light having wavelengths that are greater than or equal to 300 nm and less than 400 nm is less than or equal to 2.5% at the concave surface.

In order to attain the above object, a fifth aspect of the invention recited is directed to a spectacle lens, and the spectacle lens has the above-described optical product, and the base is a spectacle lens base.

An optical product and a spectacle lens according to the first and fifth aspects of the invention, a color of reflected light having a low intensity can be adjusted, with an optical multilayer film in a simplified structure, and reflectance of ultraviolet rays and visible light can be reduced sufficiently. In other words, a performance of, for example, preventing reflection of visible light can be improved and reflection of ultraviolet rays by the concave surface can be reduced, by which eyes positioned at the concave surface side can be protected from ultraviolet rays.

According to the second aspect of the invention, reflectance of the ultraviolet rays and the visible light can be further reduced.

According to the third aspect of the invention, high level reduction of reflectance of the ultraviolet rays can be performed so as to sufficiently protect eyes and the like.

DESCRIPTION OF EMBODIMENTS

Figure 1:
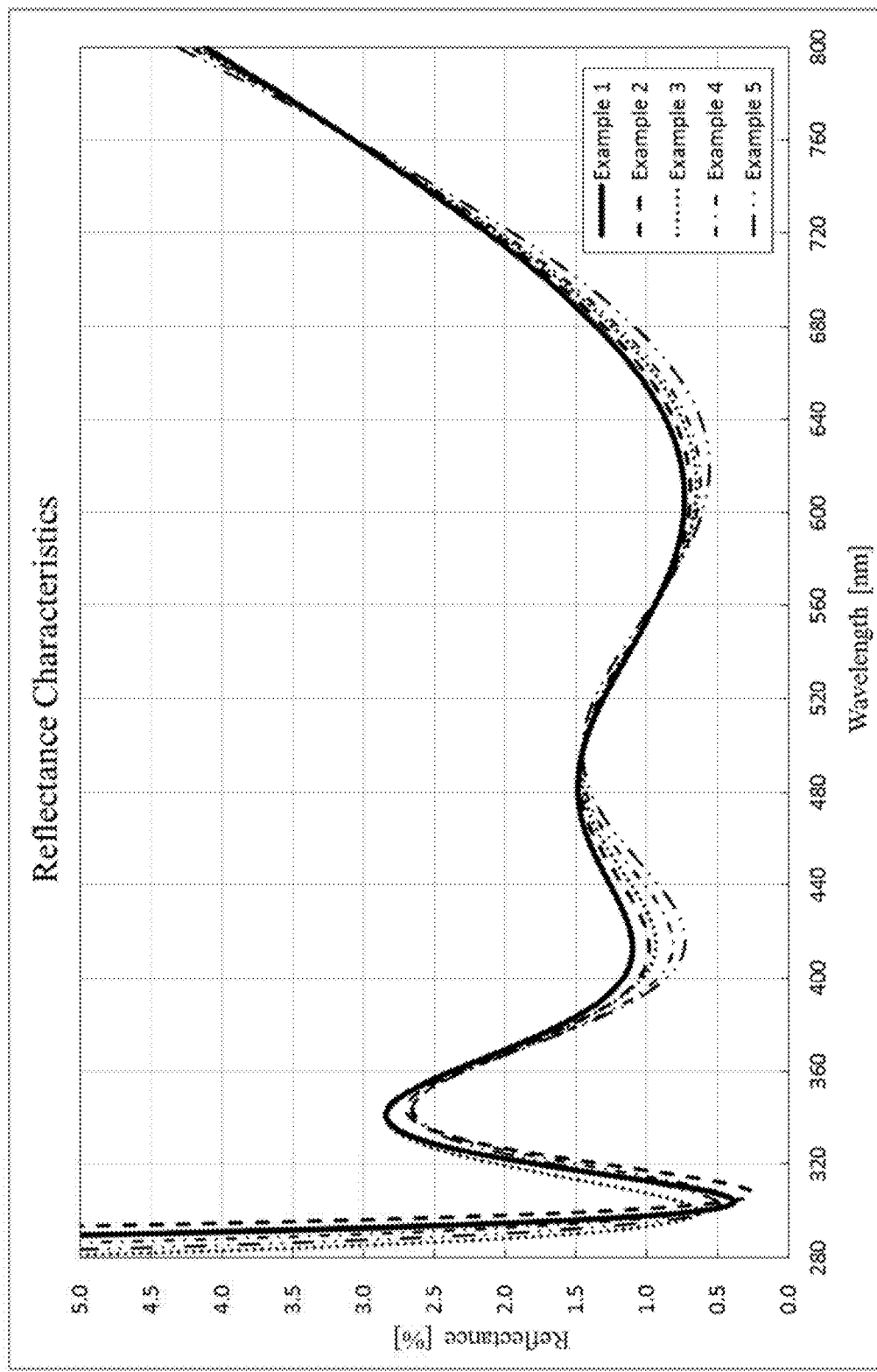
FIG. 1 shows a graph representing a spectral reflectance distribution in an ultraviolet region and a visible region according to examples 1 to 5.

An exemplary embodiment of the present invention will be described below. The present invention is not limited to the exemplary embodiment described below.

An optical product is a convex lens, and has a convex surface and a concave surface. The optical product includes a base having the convex surface and the concave surface, and an optical multilayer film formed on at least the concave surface of the base. The base itself may be regarded as the convex lens.

A material of the base may be any material such as glass or plastic. Plastic is preferably used. Examples of the material of the base include a polyurethane resin, an episulfide resin, a polycarbonate resin, an acrylic resin, a polyether sulfone resin, a poly(4-methylpentene-1) resin, and a diethylene glycol bis (allyl carbonate) resin. Typical examples of the optical product include spectacle lenses such as spectacle plastic lenses or spectacle glass lenses. Other examples of the optical product include camera lenses, projector lenses, binocular lenses, telescope lenses, and various filters. In the case of a spectacle lens, the base is a spectacle lens base.

The optical multilayer film may be formed directly on the concave surface of the base, or may be formed, via a single or plural intermediate films such as a hard coating layer, on the concave surface of the base. The hard coating layer is formed of, for example, an organosiloxane or other organosilicon compound, or an acrylic compound. A primer layer may be formed below the hard coating layer. The primer layer is formed of at least one of, for example, a polyurethane-based resin, an acrylic resin, a methacrylic resin, and an organosilicon resin.

The optical multilayer film formed on the concave surface of the base has, in total, six layers in which a high refractive index material and a low refractive index material are alternately layered. The high refractive index material is zirconium dioxide (zirconia, $ZrO_2$), and the low refractive index material is silicon dioxide (silica, $SiO_2$). The first layer is disposed closest to the base (convex surface), and the high refractive index material is disposed in the first layer. The sixth layer is formed of $SiO_2$, is disposed as the outermost layer, and contacts air. A single or plural outer films such as a water repellent film may be further formed outward of the optical multilayer film.

The optical multilayer film is formed by, for example, physical vapor deposition such as a vacuum deposition method or a sputtering method. In the vacuum deposition method, various gases such as inert gas may be supplied at the deposition, conditions (an amount to be supplied, pressure at film forming, or the like) for supplying the gases may be controlled, an ion-assisted method in which various ions are introduced at a predetermined acceleration voltage or acceleration current when the film is formed may be implemented, or plasma treatment may be performed when the film is formed.

The fourth layer, which is the low refractive index layer ($SiO_2$ layer), in the optical multilayer film of the six layers is produced such that the physical film thickness of the fourth layer is greater than or equal to 10 nm and not greater than 22 nm. When the physical film thickness of the fourth layer is less than 10 nm, accurate film formation of the fourth layer may be relatively difficult. Further, since the fourth layer is too thin, it may be difficult to achieve conformity of a reflectance of light in an ultraviolet region at the target level regardless of how the other layers are designed.

The target level of the reflectance of light in the ultraviolet region is such that an average reflectance of light having wavelengths that are greater than or equal to 280 nm and less than 400 nm, is less than or equal to 3.5%, and/or an average reflectance of light having wavelengths that are greater than or equal to 300 nm and less than 400 nm, is less than or equal to 2.5%. When a reflectance of light in the ultraviolet region has such a level at the concave surface of the convex lens, and reflection of the ultraviolet rays is prevented at this level, an amount of ultraviolet rays that are obliquely incident on the concave surface and are reflected without transmission can be sufficiently reduced, and an object on the concave surface side can be protected from the ultraviolet rays. For example, when the convex lens is a spectacle lens, and eyes are on the concave surface side, an amount of ultraviolet rays that are incident on the face from the obliquely rear side, reflected by the concave surface, and enter the eyes, can be sufficiently reduced.

Meanwhile, also when the physical film thickness of the fourth layer is greater than 22 nm, it may be difficult to achieve conformity of a reflectance of light in the ultraviolet region at the target level regardless of how the other layers are designed. Further, the reflectance of light in a visible region may be, for example, such that an average reflectance of light in the visible region is greater than 5%, so that the reflection prevention level may be reduced and may not match that for light in the ultraviolet region. The visible region represents a wavelength range of general visible light, and light in the visible region has, for example, a wavelength that is greater than or equal to 400 nm and not greater than 800 nm, a wavelength that is greater than or equal to 400 nm and not greater than 760 nm, or a wavelength that is greater than or equal to 400 nm and not greater than 720 nm.

Further, when the physical film thickness of at least one of the fourth layer and the layers inward of the fourth layer (the first to the fourth layers) in the optical multilayer film of the six layers is reduced by a certain amount as appropriate, in addition to the adjustment of the range of the physical film thickness of the fourth layer, the reflectance of light in the visible region is further reduced sufficiently, and the reflectance of light in the ultraviolet region can be reduced to the above-described level.

In particular, when a sum of the physical film thickness of the first layer which is the high refractive index layer ($ZrO_2$ layer) and the physical film thickness of the second layer which is the low refractive index layer ($SiO_2$ layer) is greater than or equal to 35 nm and not greater than 45 nm, the reflectance of light in the visible region can be sufficiently reduced, and the reflectance of light in the ultraviolet region can be reduced so as to meet the above-described level. When the sum of the physical film thicknesses is less than 35 nm, it may be relatively difficult to form films of the first layer and the second layer, and it may be difficult to reduce the reflectance of light in the ultraviolet region so as to reach the above-described level no matter how the other layers are designed. Meanwhile, also when the sum of the physical film thicknesses is greater than 45 nm, it may be difficult to reduce the reflectance of light in the ultraviolet region so as to reach the above-described level, and the reflectance of light in the visible region may not be sufficiently reduced.

Further, also when the total sum of the physical film thicknesses of the first to the fourth layers (the first, the second, the third, and the fourth layers) is greater than or equal to 100 nm and not greater than 110 nm, the reflectance of light in the visible region can be sufficiently reduced, and the reflectance of light in the ultraviolet region can be reduced to the above-described level. When the total sum of the physical film thicknesses is less than 100 nm, it may be relatively difficult to sequentially form films of the first to the fourth layers, and it may be difficult to reduce the reflectance of light in the ultraviolet region so as to reach the above-described level no matter how the other layers are designed. Meanwhile, also when the total sum of the physical film thicknesses is greater than 110 nm, it may be difficult to reduce the reflectance of light in the ultraviolet region so as to reach the above-described level, and the reflectance of light in the visible region may not be sufficiently reduced.

In a case where the physical film thicknesses of the first to the sixth layers are appropriately designed so as to satisfy the condition that the physical film thickness of the fourth layer ($SiO_2$ layer) in the optical multilayer film is greater than or equal to 10 nm and not greater than 22 nm, the condition that the sum of the physical film thickness of the first layer ($ZrO_2$ layer) and the physical film thickness of the second layer ($SiO_2$ layer) is greater than or equal to 35 nm and not greater than 45 nm, and/or the condition that the total sum of the physical film thicknesses of the first layer to the fourth layers is greater than or equal to 100 nm and not greater than 110 nm, light (having a low intensity as compared to incident light) reflected by the optical multilayer film can have any color, and the reflectance of light in the ultraviolet region in addition to the reflectance of light in the visible region can be extremely reduced.

Examples of the color of light reflected by the optical multilayer film include achromatic color, blue color, pink color, green color, and orange color.

Further, advantageously, the color of light reflected by the optical multilayer film formed on the concave surface is set so as to match a color of light reflected by the convex surface. Thus, when the lens or a person (for example, a wearer of the spectacle lens) having the lens is seen from the outside, colors of the light reflected by the lens are harmonized, so that they look beautiful without flicker. Further, flicker in color of light observed through the lens is reduced also for the person having the lens so that seeing of light through the lens is facilitated. The optical multilayer film may be formed on the convex surface in the same manner as for the concave surface such that equivalent films are formed on the concave and convex surfaces.

EXAMPLES

Next, various examples of the optical multilayer film having the six layers in total will be described.

Table 1 indicates film structures, various average reflectances, and x and y values, in the xy color system, of colors of light reflected by the concave surfaces according to examples 1 to 5. FIG. 1 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 1 to 5. FIG. 2(a) shows a graph in which (x, y) values of colors of light reflected by the concave surfaces of examples 1 to 5 are plotted based on the xy-coordinate (CIE Chromaticity Diagram) in the xy color system.

The (x, y) values of a color of reflected light represents values obtained when a D65 light source is used and a viewing angle is 2°. The same applies to the other following examples.

TABLE 1

| Layer | Material | Physical film thickness [nm] | Example 1 Refractive index $\lambda$ = 500 nm | Example 1 Optical film thickness $\times\lambda$ | Example 2 Refractive index $\lambda$ = 500 nm | Example 2 Optical film thickness $\times\lambda$ | Example 3 Refractive index $\lambda$ = 500 nm | Example 3 Optical film thickness $\times\lambda$ | Example 4 Refractive index $\lambda$ = 500 nm | Example 4 Optical film thickness $\times\lambda$ | Example 5 Refractive index $\lambda$ = 500 nm | Example 5 Optical film thickness $\times\lambda$ |
|---|---|---|---|---|---|---|---|---|---|---|---|---|
| First layer | $ZrO_2$ | 18.97 | 2.0288 | 0.0770 | 2.0504 | 0.0778 | 2.0726 | 0.0786 | 2.0920 | 0.0794 | 2.1264 | 0.0807 |
| Second layer | $SiO_2$ | 22.45 | 1.4776 | 0.0663 | 1.4776 | 0.0663 | 1.4776 | 0.0663 | 1.4776 | 0.0663 | 1.4776 | 0.0663 |
| Third layer | $ZrO_2$ | 45.45 | 2.0288 | 0.1844 | 2.0504 | 0.1864 | 2.0726 | 0.1884 | 2.0920 | 0.1902 | 2.1264 | 0.1933 |
| Fourth layer | $SiO_2$ | 16.77 | 1.4776 | 0.0496 | 1.4776 | 0.0496 | 1.4776 | 0.0496 | 1.4776 | 0.0496 | 1.4776 | 0.0496 |
| Fifth layer | $ZrO_2$ | 27.19 | 2.0288 | 0.1103 | 2.0504 | 0.1115 | 2.0726 | 0.1127 | 2.0920 | 0.1138 | 2.1264 | 0.1156 |
| Sixth layer | $SiO_2$ | 80.64 | 1.4776 | 0.2383 | 1.4776 | 0.2383 | 1.4776 | 0.2383 | 1.4776 | 0.2383 | 1.4776 | 0.2383 |
| Average reflectance [%] of light having wavelengths of 280 to 400 nm | | | 2.67 | | 3.25 | | 1.97 | | 2.08 | | 1.92 | |
| Average reflectance [%] of light having wavelengths of 300 to 400 nm | | | 1.85 | | 1.70 | | 1.92 | | 1.69 | | 1.73 | |
| xy color system | | | x | 0.26 | x | 0.26 | x | 0.26 | x | 0.26 | x | 0.26 |
| | | | y | 0.29 | y | 0.30 | y | 0.30 | y | 0.31 | y | 0.32 |

Total sum of film thicknesses of the first to the fourth layers: 103.64 nm
Sum of film thicknesses of the first and the second layers: 41.42 nm In examples 1 to 5, an optical multilayer film having six layers is formed as an antireflection film directly on a concave surface of a plastic lens base having a convex surface and the concave surface by a vacuum deposition method. On the convex surface, no films such as an antireflection film are formed. The physical film thickness of each layer of the optical multilayer film can be calculated based on deposition conditions such as deposition time or pressure in a vacuum chamber (pressure at film formation).

In each of examples 1 to 5, the same lens base is used. The lens base is formed of a thiourethane resin, and the refractive index is 1.60, the Abbe number is 42, and the power is −0.00 (substrate in which the convex surface and the concave surface have the same curve).

As indicated in the upper left portion of Table 1, in the optical multilayer film of each of examples 1 to 5, the $ZrO_2$ layer and the $SiO_2$ layer are alternately disposed such that a layer closest to the base is the first layer, the first layer is formed of $ZrO_2$, the second layer is formed of $SiO_2$, and the physical film thickness of the corresponding layer among examples 1 to 5 is the same (such that the physical film thicknesses of the first layer to the sixth layer are 18.97 nm, 22.45 nm, 45.45 nm, 16.77 nm, 27.19 nm, and 80.64 nm, respectively, in each example).

The physical film thickness of the fourth layer of the optical multilayer film in each of examples 1 to 5 is 16.77 nm, and is thus greater than or equal to 10 nm and not greater than 22 nm.

Further, the sum of the physical film thicknesses of the first layer and the second layer is 18.97+22.45=41.42 nm, and is thus greater than or equal to 35 nm and not greater than 45 nm.

Moreover, the total sum of the physical film thicknesses of the first layer to the fourth layer is 18.97+22.45+45.45+16.77=103.64 nm, and is thus greater than or equal to 100 nm and not greater than 110 nm.

The refractive index of the $ZrO_2$ layer is different among examples 1 to 5. In Table 1, the refractive index of the $ZrO_2$ layer is for light having the wavelength of 500 nm ($\lambda$=500 nm). The refractive index of the $ZrO_2$ layer varies depending on, for example, a design wavelength in designing of the optical multilayer film, a deposition speed in processing, or introduction of oxygen gas, argon gas, or the like, in the ion-assisted method. In example 1, the refractive index of the $ZrO_2$ layer of each of the first, the third, and the fifth layers is 2.0288. Similarly, the refractive index of each $ZrO_2$ layer is 2.0504 in example 2, the refractive index of each $ZrO_2$ layer is 2.0726 in example 3, the refractive index of each $ZrO_2$ layer is 2.0920 in example 4, and the refractive index of each $ZrO_2$ layer is 2.1264 in example 5. The refractive index ($\lambda$=500 nm) of each $SiO_2$ layer is 1.4776 in each of examples 1 to 5.

While the refractive index of the $ZrO_2$ layer is gradually increased from 2.0288 to 2.1264 in examples 1 to 5, the average reflectance of light having wavelengths that are greater than or equal to 280 nm and less than 400 nm (hereinafter, referred to as a "first ultraviolet region") is 2.67%, 3.25%, 1.97%, 2.08%, and 1.92% in examples 1 to 5, respectively. That is, in each example, the average reflectance thereof is reduced so as to be less than or equal to 3.5%, and the reflectance of light in the first ultraviolet region is sufficiently reduced. Further, the average reflectance of light having wavelengths that are greater than or equal to 300 nm and less than 400 nm (hereinafter, referred to as a "second ultraviolet region") is 1.85%, 1.70%, 1.92%, 1.69%, and 1.73% in examples 1 to 5, respectively. That is, in each example, the average reflectance thereof is reduced so as to be less than or equal to 2.5%, and the reflectance of light in the second ultraviolet region is sufficiently reduced.

Furthermore, in examples 1 to 5, the reflectance of light in the visible region (the wavelength is greater than or equal to 400 nm and not greater than 720 nm) is less than or equal to 2.5% for all the wavelengths as shown in FIG. 1 or the like, and the reflectance of light in the visible region is also sufficiently reduced.

The reason why the reflection of light in the ultraviolet region and the visible region is prevented as shown in the examples above is considered as follows. The physical film thickness of the fourth layer is 16.77 nm and is thus greater than or equal to 10 nm and not greater than 22 nm, the sum of the physical film thicknesses of the first layer and the second layer is 41.42 nm and is thus greater than or equal to 35 nm and not greater than 45 nm, and the total sum of the physical film thicknesses of the first layer to the fourth layer is 103.64 nm and is thus greater than or equal to 100 nm and not greater than 110 nm.

When the lens of each of examples 1 to 5 is used as a spectacle lens, ultraviolet rays incident from the obliquely lateral rear side of a face when wearing the lens, are hardly reflected by the concave surface (rear surface) and can be sufficiently transmitted therethrough. Therefore, eyes can be protected from the ultraviolet rays incident from the obliquely lateral rear side.

Furthermore, in a case where the lens of each of examples 1 to 5 is not a spectacle glass lens but a spectacle plastic lens, an ultraviolet cutting agent such as an ultraviolet absorber is mixed in the lens base to cut light in the ultraviolet region, thereby protecting the eyes from the ultraviolet rays. In this case, the ultraviolet rays transmitted through the concave surface are sufficiently cut at the base.

In addition, a color of light reflected by the concave surface having the optical multilayer film satisfies (x, y)=(0.26, 0.29), (0.26, 0.30), (0.26, 0.30), (0.26, 0.31), and (0.26, 0.32) in examples 1 to 5, respectively. That is, the color satisfies (x, y)=(0.26, 0.29 to 0.32), represents an achromatic color, and belongs to an achromatic color area in the system in each example.

When a colorless optical multilayer film (antireflection film or the like) is further formed on the convex surface of the lens base, a lens has reflection prevention properties or the like, which can prevents ultraviolet rays reflected by the lens rear surface from being incident on eyes with a relatively high intensity. Further, a difference in color of reflected light between the convex surface and the concave surface is prevented, so that an uncomfortable outer appearance or visibility is prevented.

Figure 3:
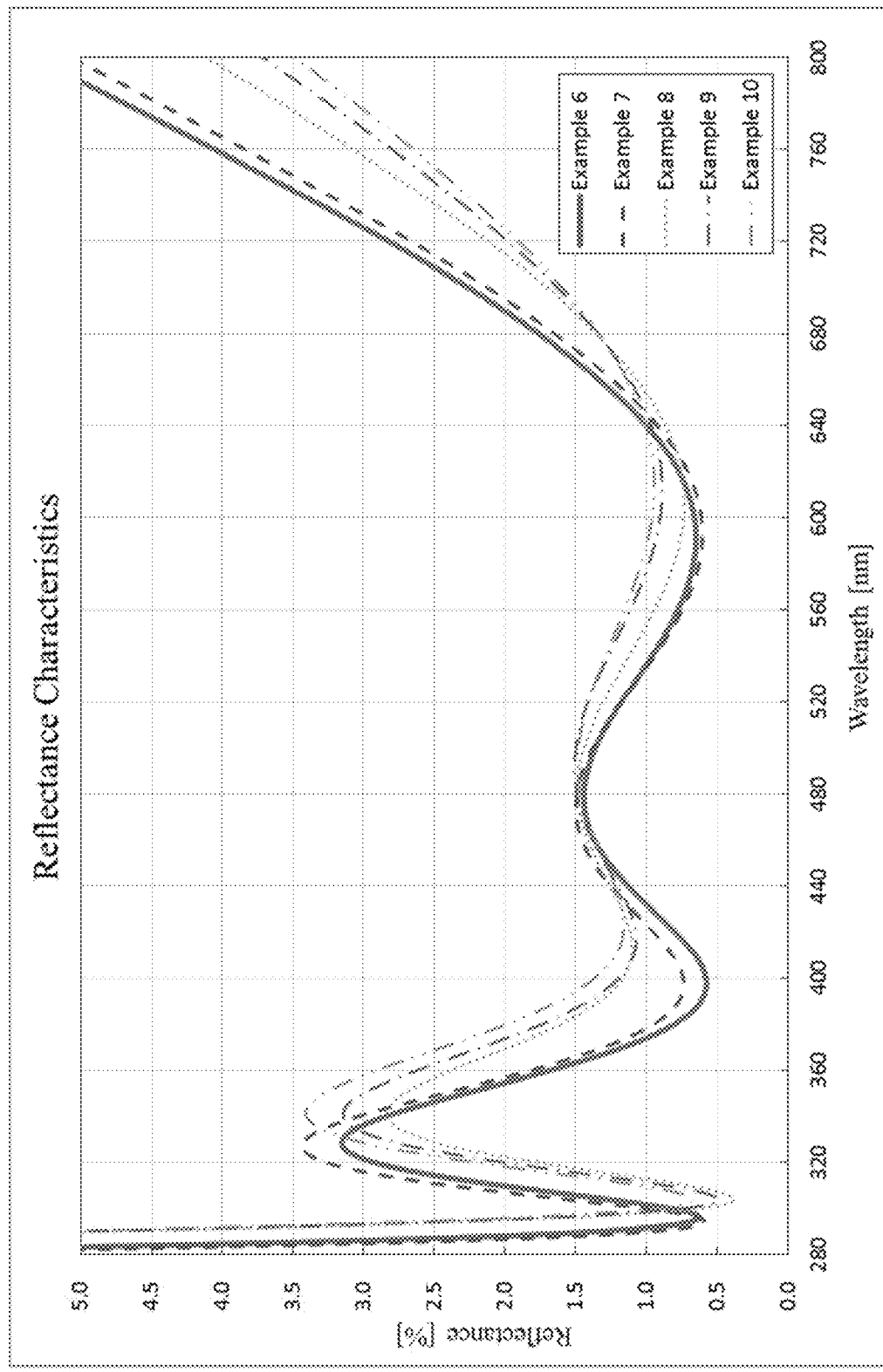
FIG. 3 shows a graph representing a spectral reflectance distribution in the ultraviolet region and the visible region according to examples 6 to 10.

Table 2 indicates film structures, various average reflectances, and x and y values, in the xy color system, of colors of light reflected by the concave surfaces according to examples 6 to 10. FIG. 3 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 6 to 10.

TABLE 2

| | | | Example 6 | | Example 7 | | Example 8 | | Example 9 | | Example 10 | |
|---|---|---|---|---|---|---|---|---|---|---|---|---|
| Layer | Material | Refractive index $\lambda$ = 500 nm | Physical film thickness [nm] | Optical film thickness ×$\lambda$ | Physical film thickness [nm] | Optical film thickness ×$\lambda$ | Physical film thickness [nm] | Optical film thickness ×$\lambda$ | Physical film thickness [nm] | Optical film thickness ×$\lambda$ | Physical film thickness [nm] | Optical film thickness ×$\lambda$ |
| First layer | $ZrO_2$ | 2.0288 | 20.40 | 0.0828 | 20.31 | 0.0824 | 18.97 | 0.0770 | 18.62 | 0.0756 | 17.81 | 0.0723 |
| Second layer | $SiO_2$ | 1.4776 | 16.71 | 0.0494 | 17.68 | 0.0522 | 22.45 | 0.0663 | 25.06 | 0.0741 | 27.00 | 0.0798 |

TABLE 2-continued

| Layer | Material | Refractive index λ = 500 nm | Example 6 Physical film thickness [nm] | Example 6 Optical film thickness ×λ | Example 7 Physical film thickness [nm] | Example 7 Optical film thickness ×λ | Example 8 Physical film thickness [nm] | Example 8 Optical film thickness ×λ | Example 9 Physical film thickness [nm] | Example 9 Optical film thickness ×λ | Example 10 Physical film thickness [nm] | Example 10 Optical film thickness ×λ |
|---|---|---|---|---|---|---|---|---|---|---|---|---|
| Third layer | $ZrO_2$ | 2.0288 | 53.52 | 0.2172 | 50.01 | 0.2029 | 45.45 | 0.1844 | 40.23 | 0.1632 | 37.31 | 0.1514 |
| Fourth layer | $SiO_2$ | 1.4776 | 10.00 | 0.0296 | 12.00 | 0.0355 | 16.77 | 0.0496 | 20.00 | 0.0591 | 22.00 | 0.0650 |
| Fifth layer | $ZrO_2$ | 2.0288 | 28.97 | 0.1175 | 27.53 | 0.1117 | 27.19 | 0.1103 | 26.15 | 0.1061 | 25.08 | 0.1018 |
| Sixth layer | $SiO_2$ | 1.4776 | 75.15 | 0.2221 | 76.72 | 0.2267 | 80.64 | 0.2383 | 83.04 | 0.2454 | 85.23 | 0.2519 |
| Average reflectance [%] of light having wavelengths of 280 to 400 nm | | | 1.95 | | 2.04 | | 2.67 | | 2.91 | | 3.04 | |
| Average reflectance [%] of light having wavelengths of 300 to 400 nm | | | 1.81 | | 2.02 | | 1.85 | | 2.05 | | 2.25 | |
| Sum [nm] of physical film thicknesses of first layer and second layer | | | 37.11 | | 37.99 | | 41.42 | | 43.68 | | 44.81 | |
| Total sum [nm] of physical film thicknesses of first to fourth layer | | | 100.63 | | 100.00 | | 103.64 | | 103.91 | | 104.12 | |
| xy color system | | | X | 0.27 | x | 0.26 | x | 0.26 | x | 0.28 | x | 0.28 |
| | | | Y | 0.28 | y | 0.27 | y | 0.29 | y | 0.31 | y | 0.31 |

The formation for examples 6 to 10 is the same as the formation for examples 1 to 5 except for the film structure of the optical multilayer film having six layers. However, example 8 is the same as example 1.

As indicated in the upper left portion of Table 2, in each of examples 6 to 10, the refractive index (λ=500 nm) of the $ZrO_2$ layer is 2.0288. In example 6, the physical film thicknesses of the first layer to the sixth layer of the optical multilayer film are 20.40 nm, 16.71 nm, 53.52 nm, 10.00 nm, 28.97 nm, and 75.15 nm, respectively. In example 7, the physical film thicknesses of the first to the sixth layer are 20.31 nm, 17.68 nm, 50.01 nm, 12.00 nm, 27.53 nm, and 76.72 nm, respectively. In example 8, the physical film thicknesses of the first layer to the sixth layer are 18.97 nm, 22.45 nm, 45.45 nm, 16.77 nm, 27.19 am, and 80.64 nm, respectively. In example 9, the physical film thicknesses of the first layer to the sixth layer are 18.62 nm, 25.06 nm, 40.23 nm, 20.00 nm, 26.15 nm, and 83.04 nm, respectively. In example 10, the physical film thicknesses of the first layer to the sixth layer are 17.81 nm, 27.00 nm, 37.31 nm, 22.00 nm, 25.08 nm, and 85.23 nm, respectively.

The physical film thickness of the fourth layer of the optical multilayer film is 10.00 nm, 12.00 nm, 16.77 nm, 20.00 nm, and 22.00 nm in examples 6 to 10, respectively, and is thus greater than or equal to 10 nm and not greater than 22 nm in each example.

Further, the sum of the physical film thicknesses of the first layer and the second layer is 37.11 nm, 37.99 nm, 41.42 nm, 43.68 nm, and 44.81 nm in examples 6 to 10, respectively, and the sum thereof is greater than or equal to 35 nm and not greater than 45 nm in each example.

Further, the total sum of the physical film thicknesses of the first layer to the fourth layer is 100.63 nm, 100.00 nm, 103.64 nm, 103.91 nm, and 104.12 nm in examples 6 to 10, respectively, and the total sum thereof is greater than or equal to 100 nm and not greater than 110 am in each example.

While the physical film thickness of the fourth layer is gradually increased from 10.00 nm to 22.00 nm in examples 6 to 10, the average reflectance of light in the first ultraviolet region is 1.95%, 2.04%, 2.67%, 2.91%, and 3.04% in examples 6 to 10, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 1.81%, 2.02%, 1.85%, 2.05%, and 2.25% in examples 6 to 10, respectively. That is, in each example, the reflectance thereof is reduced so as to be less than or equal to 2.5%, and the reflectance of light in the second ultraviolet region is sufficiently reduced.

Further, in examples 6 to 10, the reflectance of light in the visible region (the wavelength is greater than or equal to 400 nm and not greater than 720 nm) is less than or equal to 3% for all the wavelengths as shown in FIG. 3 or the like, and reflectance of light in the visible region is also sufficiently reduced.

However, in a comparative example which does not belong to the present invention, in a case where the physical film thickness of the fourth layer is less than 10.00 nm or greater than 22.00 nm, it is difficult to reduce the average reflectance of light in at least one of the ultraviolet regions to the above-described level. Further, it is difficult to perform high level reduction of the reflectance of light in the visible region such that the reflectance of light in the visible region is, for example, less than or equal to 3% or less than or equal to 3.5%, or less than or equal to 4% or less than or equal to 4.5% in the entirety of the visible region.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region and the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 6 to 10 is used as a spectacle lens, ultraviolet rays incident from the obliquely lateral rear side of a face when wearing the lens, are hardly reflected by the concave surface (rear surface) and can be sufficiently transmitted therethrough, Therefore, eyes can be protected from the ultraviolet rays incident from the obliquely lateral rear side.

Figure 4:
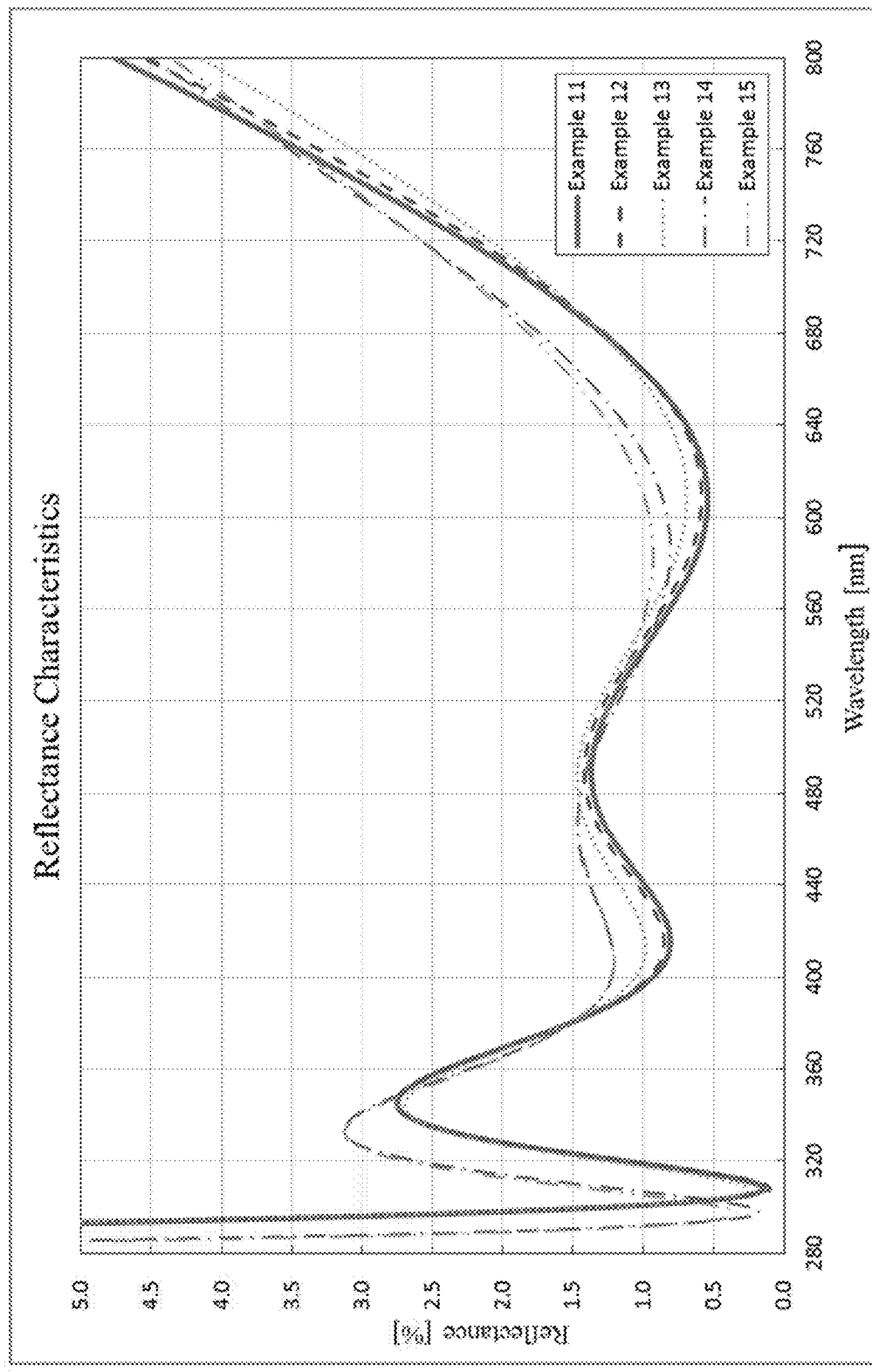
FIG. 4 shows a graph representing a spectral reflectance distribution in the ultraviolet region and the visible region according to examples 11 to 15.

In addition, a color of light reflected by the concave surface having the optical multilayer film satisfies (x, y)= (0.25 to 0.29, 0.28 to 0.31) in examples 6 to 10, represents an achromatic color, and belongs to an achromatic color area in the system in each example Table 3 indicates film structures, various average reflectances, and x and y values, in the xy color system, of colors of light reflected by the concave surfaces according to examples 11 to 15. FIG. 4 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 11 to 15.

TABLE 3

| Layer | Material | Refractive index λ = 500 nm | Example 11 | | Example 12 | | Example 13 | | Example 14 | | Example 15 | |
|---|---|---|---|---|---|---|---|---|---|---|---|---|
| | | | Physical film thickness [nm] | Optical film thickness ×λ | Physical film thickness [nm] | Optical film thickness ×λ | Physical film thickness [nm] | Optical film thickness ×λ | Physical film thickness [nm] | Optical film thickness ×λ | Physical film thickness [nm] | Optical film thickness ×λ |
| First layer | $ZrO_2$ | 2.0504 | 19.79 | 0.0812 | 20.01 | 0.0821 | 18.97 | 0.0778 | 17.09 | 0.0701 | 16.22 | 0.0665 |
| Second layer | $SiO_2$ | 1.4776 | 17.69 | 0.0523 | 18.94 | 0.0560 | 22.45 | 0.0663 | 25.17 | 0.0744 | 26.93 | 0.0796 |
| Third layer | $ZrO_2$ | 2.0504 | 61.55 | 0.2524 | 55.92 | 0.2293 | 45.45 | 0.1864 | 38.27 | 0.1569 | 35.00 | 0.1435 |
| Fourth layer | $SiO_2$ | 1.4776 | 10.00 | 0.0296 | 12.00 | 0.0355 | 16.77 | 0.0496 | 20.00 | 0.0591 | 22.00 | 0.0650 |
| Fifth layer | $ZrO_2$ | 2.0504 | 26.86 | 0.1101 | 27.56 | 0.1130 | 27.19 | 0.1115 | 23.92 | 0.0981 | 23.24 | 0.0953 |
| Sixth layer | $SiO_2$ | 1.4776 | 76.16 | 0.2251 | 77.38 | 0.2287 | 80.64 | 0.2383 | 80.25 | 0.2372 | 81.38 | 0.2405 |
| Average reflectance [%] of light having wavelengths of 280 to 400 nm | | | 2.98 | | 3.14 | | 3.25 | | 2.26 | | 2.29 | |
| Average reflectance [%] of light having wavelengths of 300 to 400 nm | | | 1.67 | | 1.67 | | 1.70 | | 2.06 | | 2.07 | |
| Sum [nm] of physical film thicknesses of first layer and second layer | | | 37.48 | | 38.95 | | 41.42 | | 42.26 | | 43.15 | |
| Total sum [nm] of physical film thicknesses of first layer to fourth layer | | | 109.03 | | 106.87 | | 103.64 | | 100.53 | | 100.15 | |
| xy color system | | | x | 0.25 | x | 0.26 | x | 0.26 | x | 0.27 | x | 0.29 |
| | | | y | 0.30 | y | 0.30 | y | 0.30 | y | 0.27 | y | 0.29 |

The formation for examples 11 to 15 is the same as the formation for examples 6 to 10. In each of examples 11 to 15, the refractive index (λ=500 nm) of the $ZrO_2$ layer is 2.0504. As indicated in Table 3, the physical film thicknesses of the layers other than the fourth layer in examples 11 to 15 are slightly adjusted so as to be changed from those of examples 6 to 10. Further, example 13 is the same as example 2.

The sum of the physical film thicknesses of the first layer and the second layer is 37.48 nm, 38.95 nm, 41.42 nm, 42.26 nm, and 43.15 nm in examples 11 to 15, respectively, and the sum thereof is greater than or equal to 35 nm and not greater than 45 nm in each example.

Further, the total sum of the physical film thicknesses of the first layer to the fourth layer is 109.03 nm, 106.87 nm, 103.64 nm, 100.53 nm, and 100.15 nm in examples 11 to 15, respectively, and the total sum thereof is greater than or equal to 100 nm and not greater than 110 nm in each example.

While the physical film thickness of the fourth layer is gradually increased from 10.00 nm to 22.00 nm in examples 11 to 15, the average reflectance of light in the first ultraviolet region is 2.98%, 3.14%, 3.25%, 2.26%, and 2.29% in examples 11 to 15, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 1.67%, 1.67%, 1.70%, 2.06%, and 2.07% in examples 11 to 15, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level.

Further, in examples 11 to 15, the reflectance of light in the visible region (the wavelength is greater than or equal to 400 nm and not greater than 720 nm) is less than or equal to 3% for all the wavelengths as shown in FIG. 4 or the like, and the reflectance of light in the visible region is also sufficiently reduced.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 11 to 15 is used as a spectacle lens, ultraviolet rays incident from the obliquely lateral rear side of a face when wearing the lens, are hardly reflected by the concave surface (rear surface) and can be sufficiently transmitted therethrough. Therefore, eyes can be protected from the ultraviolet rays incident from the obliquely lateral rear side.

Figure 5:
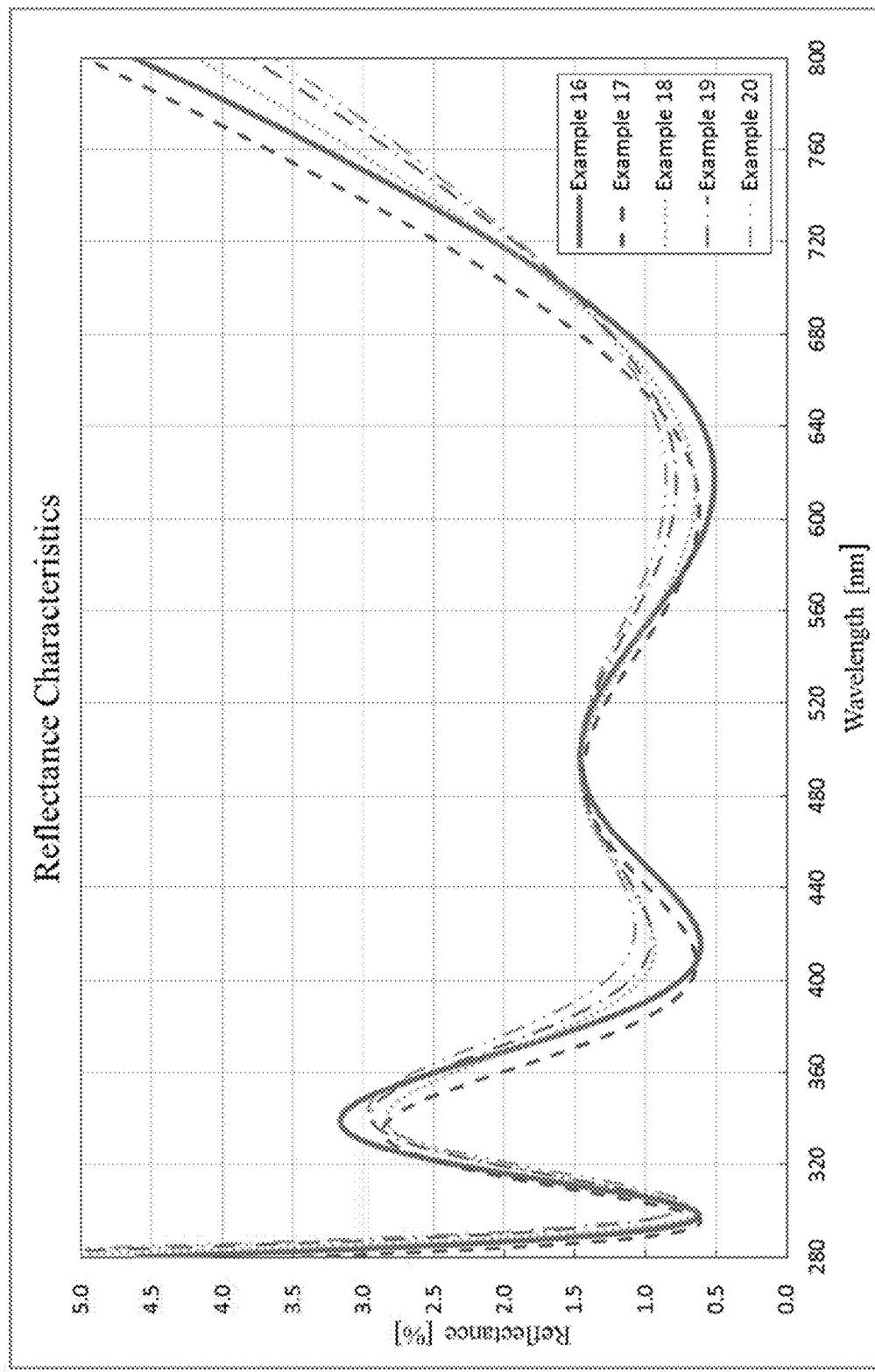
FIG. 5 shows a graph representing a spectral reflectance distribution in the ultraviolet region and the visible region according to examples 16 to 20.

In addition, a color of light reflected by the concave surface having the optical multilayer film satisfies $(x, y) = (0.25$ to $0.29, 0.27$ to $0.30)$ in examples 11 to 15, represents an achromatic color, and belongs to an achromatic color area in the system in each example Table 4 indicates film structures, various average reflectances, and x and y values, in the xy color system, of colors of light reflected by the concave surfaces according to examples 16 to 20. FIG. 5 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 16 to 20.

TABLE 4

| | | | Example 16 | | Example 17 | | Example 18 | | Example 19 | | Example 20 | |
|---|---|---|---|---|---|---|---|---|---|---|---|---|
| Layer | Material | Refractive index $\lambda =$ 500 nm | Physical film thickness [nm] | Optical film thickness ×λ | Physical film thickness [nm] | Optical film thickness ×λ | Physical film thickness [nm] | Optical film thickness ×λ | Physical film thickness [nm] | Optical film thickness ×λ | Physical film thickness [nm] | Optical film thickness ×λ |
| First layer | $ZrO_2$ | 2.0726 | 20.78 | 0.0861 | 20.05 | 0.0831 | 18.97 | 0.0786 | 18.27 | 0.0757 | 17.53 | 0.0727 |
| Second layer | $SiO_2$ | 1.4776 | 16.78 | 0.0496 | 18.73 | 0.0554 | 22.45 | 0.0663 | 25.17 | 0.0744 | 27.03 | 0.0799 |
| Third layer | $ZrO_2$ | 2.0726 | 60.49 | 0.2507 | 52.62 | 0.2181 | 45.45 | 0.1884 | 40.45 | 0.1677 | 38.31 | 0.1588 |
| Fourth layer | $SiO_2$ | 1.4776 | 10.00 | 0.0296 | 12.00 | 0.0355 | 16.77 | 0.0496 | 20.00 | 0.0591 | 22.00 | 0.0650 |
| Fifth layer | $ZrO_2$ | 2.0726 | 27.15 | 0.1125 | 28.41 | 0.1178 | 27.19 | 0.1127 | 26.34 | 0.1092 | 25.37 | 0.1052 |
| Sixth layer | $SiO_2$ | 1.4776 | 76.70 | 0.2267 | 76.45 | 0.2259 | 80.64 | 0.2383 | 83.01 | 0.2453 | 84.16 | 0.2487 |
| Average reflectance [%] of light having wavelengths of 280 to 400 nm | | | 1.99 | | 1.74 | | 1.97 | | 2.14 | | 2.19 | |
| Average reflectance [%] of light having wavelengths of 300 to 400 nm | | | 2.03 | | 1.82 | | 1.92 | | 2.02 | | 2.05 | |
| Sum [nm] of physical film thicknesses of first layer and second layer | | | 37.56 | | 38.78 | | 41.42 | | 43.44 | | 44.43 | |
| Total sum [nm] of physical film thicknesses of first layer to fourth layer | | | 108.05 | | 103.40 | | 103.64 | | 103.89 | | 104.87 | |
| xy color system | | | x | 0.25 | x | 0.26 | x | 0.26 | x | 0.27 | x | 0.28 |
| | | | y | 0.33 | y | 0.31 | y | 0.30 | y | 0.32 | y | 0.31 |

The formation for examples 16 to 20 is the same as the formation for examples 6 to 10. In each of examples 16 to 20, the refractive index (λ=500 nm) of the $ZrO_2$ layer is 2.0726. As indicated in Table 4, the physical film thicknesses of the layers other than the fourth layer in each of examples 16 to 20 are slightly adjusted so as to be changed from those of examples 6 to 10. Further, example 18 is the same as example 3.

The sum of the physical film thicknesses of the first layer and the second layer is 37.56 nm, 38.78 nm, 41.42 nm, 43.44 nm, and 44.43 nm in examples 16 to 20, respectively, and the sum thereof is greater than or equal to 35 nm and not greater than 45 nm in each example.

Further, the total sum of the physical film thicknesses of the first layer to the fourth layer is 108.05 nm, 103.40 nm, 103.64 nm, 103.89 nm, and 104.87 nm in examples 16 to 20, respectively, and the total sum thereof is greater than or equal to 100 nm and not greater than 110 nm in each example.

While the physical film thickness of the fourth layer is gradually increased from 10.00 nm to 22.00 nm in examples 16 to 20, the average reflectance of light in the first ultraviolet region is 1.99%, 1.74%, 1.97%, 2.14%, and 2.19% in examples 16 to 20, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 2.03%, 1.82%, 1.92%, 2.02%, and 2.05% in examples 16 to 20, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 16 to 20, the reflectance of light in the visible region (the wavelength is greater than or equal to 400 nm and not greater than 720 nm) is less than or equal to 2.5% for all the wavelengths as shown in FIG. 5 or the like, and the reflectance of light in the visible region is also sufficiently reduced.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 16 to 20 is used as a spectacle lens, ultraviolet rays incident from the obliquely lateral rear side of a face when wearing the lens, are hardly reflected by the concave surface (rear surface) and can be sufficiently transmitted therethrough. Therefore, eyes can be protected from the ultraviolet rays incident from the obliquely lateral rear side.

Figure 6:
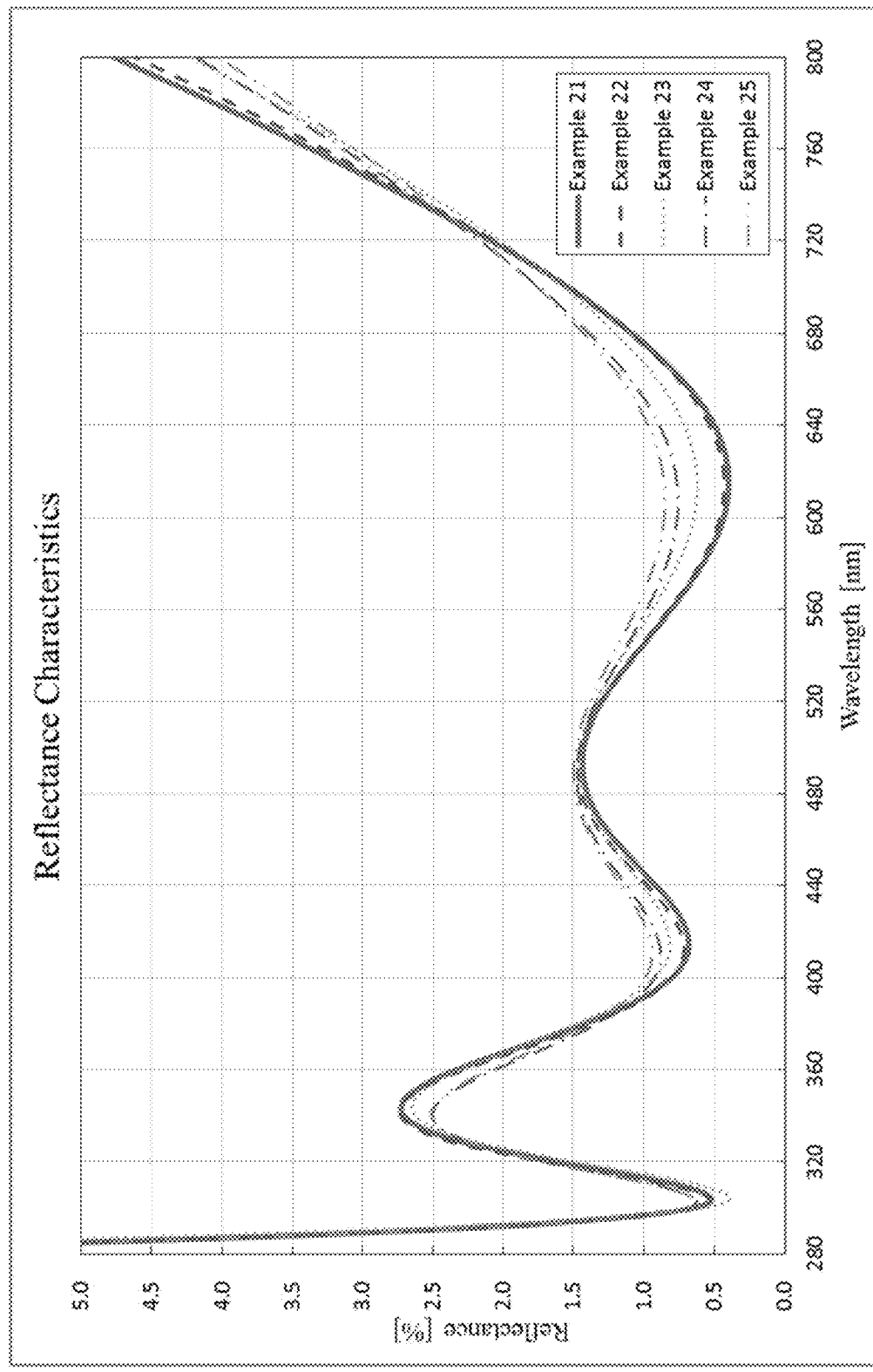
FIG. 6 shows a graph representing a spectral reflectance distribution in the ultraviolet region and the visible region according to examples 21 to 25.

In addition, a color of light reflected by the concave surface having the optical multilayer film satisfies (x, y)= (0.25 to 0.28, 0.30 to 0.33) in examples 16 to 20, represents an achromatic color, and belongs to an achromatic color area in the system in each example Table 5 indicates film structures, various average reflectances, and x and y values, in the xy color system, of colors of light reflected by the concave surfaces according to examples 21 to 25. FIG. 6 shows a graph representing a spectral reflectance distribution in the ultraviolet region (the wavelength is greater than or equal to 280 nm and less than 400 nm) and in the visible region (the wavelength is greater than or equal to 400 nm and not greater than 800 am) according to examples 21 to 25.

TABLE 5

| Layer | Material | Refractive index λ = 500 nm | Example 21 Physical film thickness [nm] | Example 21 Optical film thickness ×λ | Example 22 Physical film thickness [nm] | Example 22 Optical film thickness ×λ | Example 23 Physical film thickness [nm] | Example 23 Optical film thickness ×λ | Example 24 Physical film thickness [nm] | Example 24 Optical film thickness ×λ | Example 25 Physical film thickness [nm] | Example 25 Optical film thickness ×λ |
|---|---|---|---|---|---|---|---|---|---|---|---|---|
| First layer | $ZrO_2$ | 2.0920 | 19.47 | 0.0815 | 19.65 | 0.0822 | 18.97 | 0.0794 | 17.54 | 0.0734 | 16.91 | 0.0708 |
| Second layer | $SiO_2$ | 1.4776 | 16.95 | 0.0501 | 18.25 | 0.0539 | 22.45 | 0.0663 | 24.95 | 0.0737 | 26.56 | 0.0785 |
| Third layer | $ZrO_2$ | 2.0920 | 61.79 | 0.2585 | 55.05 | 0.2303 | 45.45 | 0.1902 | 39.59 | 0.1656 | 37.09 | 0.1552 |
| Fourth layer | $SiO_2$ | 1.4776 | 10.00 | 0.0296 | 12.00 | 0.0355 | 16.77 | 0.0496 | 20.00 | 0.0591 | 22.00 | 0.0650 |
| Fifth layer | $ZrO_2$ | 2.0920 | 26.40 | 0.1105 | 27.36 | 0.1145 | 27.19 | 0.1138 | 26.13 | 0.1093 | 25.20 | 0.1054 |
| Sixth layer | $SiO_2$ | 1.4776 | 77.07 | 0.2278 | 78.47 | 0.2319 | 80.64 | 0.2383 | 81.73 | 0.2415 | 82.63 | 0.2442 |
| Average reflectance [%] of light having wavelengths of 280 to 400 nm | | | 2.01 | | 2.01 | | 2.08 | | 1.95 | | 1.98 | |

TABLE 5-continued

|  |  |  | Example 21 | | Example 22 | | Example 23 | | Example 24 | | Example 25 | |
| --- | --- | --- | --- | --- | --- | --- | --- | --- | --- | --- | --- | --- |
| Layer | Material | Refractive index λ = 500 nm | Physical film thickness [nm] | Optical film thickness ×λ | Physical film thickness [nm] | Optical film thickness ×λ | Physical film thickness [nm] | Optical film thickness ×λ | Physical film thickness [nm] | Optical film thickness ×λ | Physical film thickness [nm] | Optical film thickness ×λ |
| Average reflectance [%] of light having wavelengths of 300 to 400 nm | | | 1.73 | | 1.73 | | 1.69 | | 1.66 | | 1.69 | |
| Sum [nm] of physical film thicknesses of first layer and second layer | | | 36.42 | | 37.90 | | 41.42 | | 42.49 | | 43.47 | |
| Total sum [nm] of physical film thicknesses of first layer to fourth layer | | | 108.21 | | 104.95 | | 103.64 | | 102.08 | | 102.56 | |
| xy color system | | | x | 0.24 | x | 0.24 | x | 0.26 | x | 0.27 | x | 0.28 |
| | | | y | 0.31 | y | 0.30 | y | 0.31 | y | 0.30 | y | 0.31 |

The formation for examples 21 to 25 is the same as the formation for examples 6 to 10. In each of examples 21 to 25, the refractive index (λ=500 nm) of the ZrO$_2$ layer is 2.0920. As indicated in Table 5, the physical film thicknesses of the layers other than the fourth layer in examples 21 to 25 are slightly adjusted so as to be changed from those of examples 6 to 10. Further, example 23 is the same as example 4.

The sum of the physical film thicknesses of the first layer and the second layer is 36.42 nm, 37.90 nm, 41.42 nm, 42.49 nm, and 43.47 nm in examples 21 to 25, respectively, and the sum thereof is greater than or equal to 35 nm and not greater than 45 nm in each example.

Further, the total sum of the physical film thicknesses of the first layer to the fourth layer is 108.21 nm, 104.95 nm, 103.64 nm, 102.08 nm, and 102.56 nm in examples 21 to 25, respectively, and the total sum thereof is greater than or equal to 100 nm and not greater than 110 nm in each example.

While the physical film thickness of the fourth layer is gradually increased from 10.00 nm to 22.00 nm in examples 21 to 25, the average reflectance of light in the first ultraviolet region is 2.01%, 2.01%, 2.08%, 1.95%, and 1.98% in examples 21 to 25, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 1.73%, 1.73%, 1.69%, 1.66%, and 1.69% in examples 21 to 25, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 21 to 25, the reflectance of light in the visible region (the wavelength is greater than or equal to 400 nm and not greater than 720 nm) is less than or equal to 2.5% for all the wavelengths as shown in FIG. 6 or the like, and the reflectance of light in the visible region is also sufficiently reduced.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 21 to 25 is used as a spectacle lens, ultraviolet rays incident from the obliquely lateral rear side of a face when wearing the lens, are hardly reflected by the concave surface (rear surface) and can be sufficiently transmitted therethrough. Therefore, eyes can be protected from the ultraviolet rays incident from the obliquely lateral rear side.

In addition, a color of light reflected by the concave surface having the optical multilayer film satisfies (x, y)= (0.24 to 0.28, 0.30 to 0.31) in examples 21 to 25, represents an achromatic color, and belongs to an achromatic color area in the system in each example.

Figure 7:
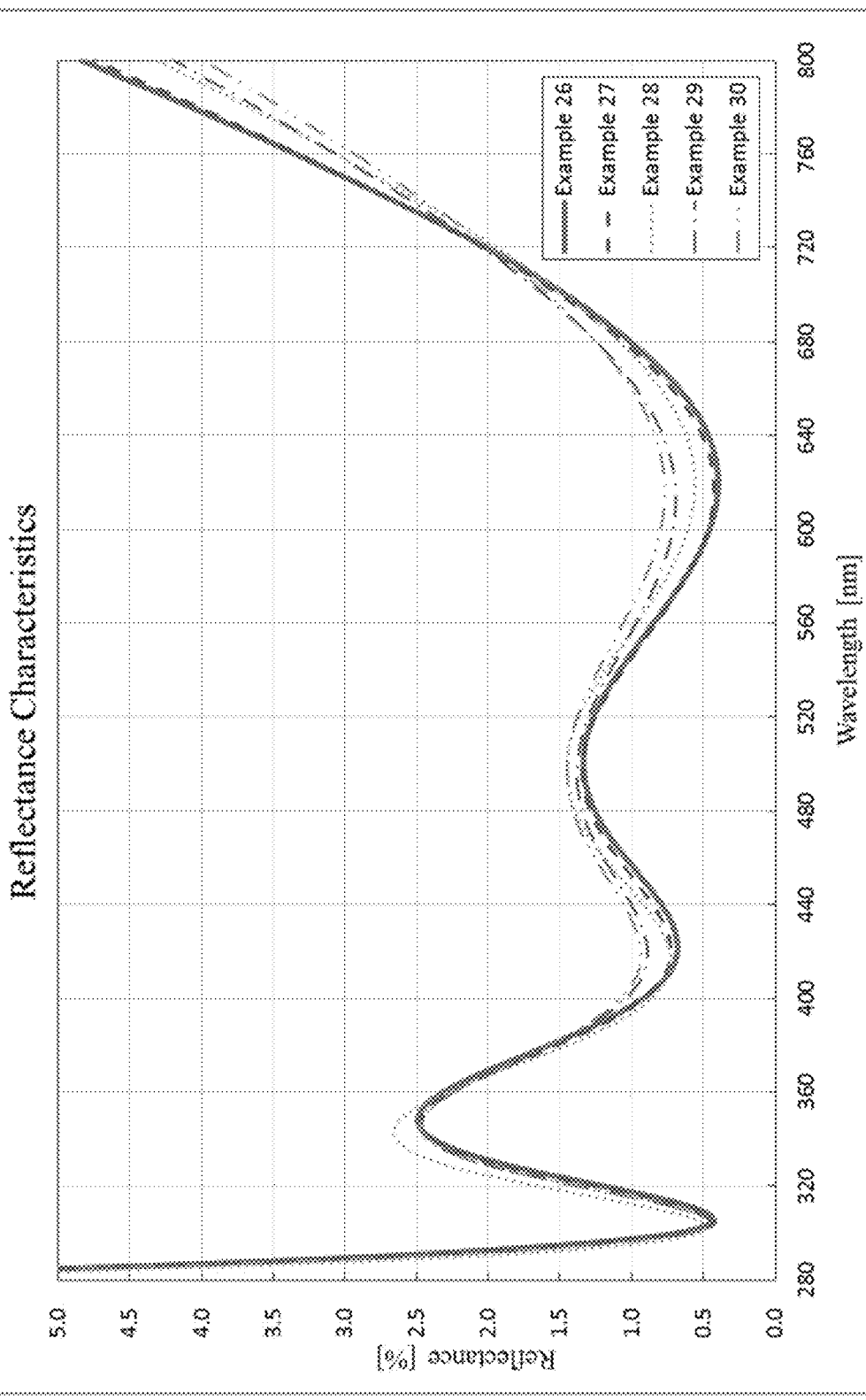
FIG. 7 shows a graph representing a spectral reflectance distribution in the ultraviolet region and the visible region according to examples 26 to 30.

Table 6 indicates film structures, various average reflectances, and x and y values, in the xy color system, of colors of light reflected by the concave surfaces according to examples 26 to 30. FIG. 7 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 26 to 30.

TABLE 6

| Layer | Material | Refractive index λ = 500 nm | Example 26 Physical film thickness [nm] | Example 26 Optical film thickness ×λ | Example 27 Physical film thickness [nm] | Example 27 Optical film thickness ×λ | Example 28 Physical film thickness [nm] | Example 28 Optical film thickness ×λ | Example 29 Physical film thickness [nm] | Example 29 Optical film thickness ×λ | Example 30 Physical film thickness [nm] | Example 30 Optical film thickness ×λ |
|---|---|---|---|---|---|---|---|---|---|---|---|---|
| First layer | $ZrO_2$ | 2.1264 | 18.97 | 0.0807 | 19.01 | 0.0808 | 18.97 | 0.0807 | 17.40 | 0.0740 | 16.99 | 0.0723 |
| Second layer | $SiO_2$ | 1.4776 | 18.10 | 0.0535 | 19.49 | 0.0576 | 22.45 | 0.0663 | 25.79 | 0.0762 | 27.09 | 0.0801 |
| Third layer | $ZrO_2$ | 2.1264 | 62.80 | 0.2671 | 55.91 | 0.2378 | 45.45 | 0.1933 | 40.66 | 0.1729 | 38.29 | 0.1628 |
| Fourth layer | $SiO_2$ | 1.4776 | 10.00 | 0.0296 | 12.00 | 0.0355 | 16.77 | 0.0496 | 20.00 | 0.0591 | 22.00 | 0.0650 |
| Fifth layer | $ZrO_2$ | 2.1264 | 26.69 | 0.1135 | 27.77 | 0.1181 | 27.19 | 0.1156 | 26.33 | 0.1120 | 25.41 | 0.1081 |
| Sixth layer | $SiO_2$ | 1.4776 | 76.93 | 0.2273 | 78.24 | 0.2312 | 80.64 | 0.2383 | 81.92 | 0.2421 | 82.79 | 0.2447 |
| Average reflectance [%] of light having wavelengths of 280 to 400 nm | | | 1.92 | | 1.90 | | 1.92 | | 1.94 | | 1.95 | |
| Average reflectance [%] of light having wavelengths of 300 to 400 nm | | | 1.62 | | 1.61 | | 1.73 | | 1.65 | | 1.67 | |
| Sum [nm] of physical film thicknesses of first layer and second layer | | | 37.07 | | 38.50 | | 41.42 | | 43.19 | | 44.08 | |
| Total sum [nm] of physical film thicknesses of first layer to fourth layer | | | 109.87 | | 106.41 | | 103.64 | | 103.85 | | 104.37 | |
| xy color system | | | x | 0.25 | x | 0.25 | x | 0.26 | x | 0.27 | x | 0.27 |
| | | | y | 0.33 | y | 0.32 | y | 0.32 | y | 0.31 | y | 0.32 |

The formation for examples 26 to 30 is the same as the formation for examples 6 to 10. In each of examples 26 to 30, the refractive index (0=500 nm) of the $ZrO_2$ layer is 2.1264. As indicated in Table 6, the physical film thicknesses of the layers other than the fourth layer in examples 26 to 30 are slightly adjusted so as to be changed from those of examples 6 to 10. Further, example 28 is the same as example 5.

The sum of the physical film thicknesses of the first layer and the second layer is 37.07 nm, 38.50 nm, 41.42 nm, 43.19 nm, and 44.08 nm in examples 26 to 30, respectively, and the sum thereof is greater than or equal to 35 nm and not greater than 45 nm in each example.

Further, the total sum of the physical film thicknesses of the first layer to the fourth layer is 109.87 nm, 106.41 nm, 103.64 nm, 103.85 nm, and 104.37 nm in examples 26 to 30, respectively, and the total sum thereof is greater than or equal to 100 nm and not greater than 110 nm in each example.

While the physical film thickness of the fourth layer is gradually increased from 10.00 nm to 22.00 nm in examples 26 to 30, the average reflectance of light in the first ultraviolet region is 1.92%, 1.90%, 1.92%, 1.94%, and 1.95% in examples 26 to 30, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 1.62%, 1.61%, 1.73%, 1.65%, and 1.67% in examples 26 to 30, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 26 to 30, the reflectance of light in the visible region (the wavelength is greater than or equal to 400 nm and not greater than 720 nm) is less than or equal to 2.0% for all the wavelengths as shown in FIG. 7 or the like, and the reflectance of light in the visible region is also sufficiently reduced.

The reason why the reflection of light in the ultraviolet region and the visible region is prevented as shown in the examples above is considered as follow. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 26 to 30 is used as a spectacle lens, ultraviolet rays incident from the obliquely lateral rear side of a face when wearing the lens, are hardly reflected by the concave surface (rear surface) and can be sufficiently transmitted therethrough. Therefore, eyes can be protected from the ultraviolet rays incident from the obliquely lateral rear side.

In addition, a color of light reflected by the concave surface having the optical multilayer film satisfies (x, y)= (0.25 to 0.27, 0.31 to 0.33) in examples 26 to 30, represents an achromatic color, and belongs to an achromatic color area in the system in each example.

Figure 8:
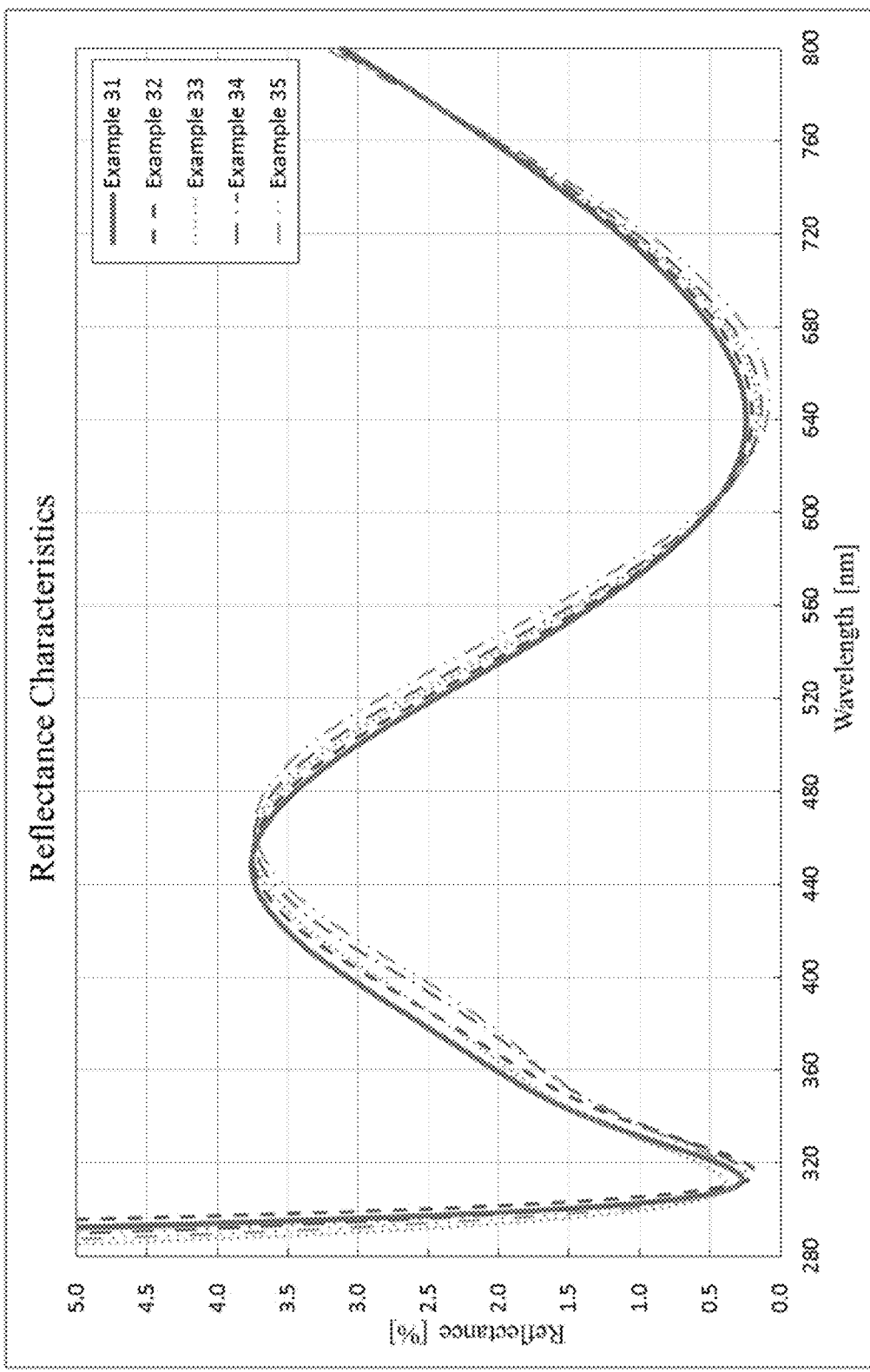
FIG. 8 shows a graph representing a spectral reflectance distribution in the ultraviolet region and the visible region according to examples 31 to 35.

Table 7 indicates film structures, various average reflectances, and x and y values, in the xy color system, of colors of light reflected by the concave surfaces according to examples 31 to 35. FIG. 8 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 31 to 35. FIG. 2(b) shows a graph in which (x, y) values of colors of light reflected by the concave surfaces of examples 31 to 35 are plotted based on the xy-coordinate in the xy color system.

to 35, the average reflectance of light in the first ultraviolet region is 2.71%, 3.19%, 1.92%, 2.10%, and 1.88% in examples 31 to 35, respectively. That is, in each example, the average reflectance thereof is reduced so as to be less than or equal to 3.5%, and the reflectance of light in the first ultraviolet region is sufficiently reduced Further, the reflectance of light in the second ultraviolet region is 1.66%, 1.54%, 1.58%, 1.39%, and 1.37% in examples 31 to 35, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 31 to 35, the reflectance of light in the visible region (the wavelength is greater than or equal to 400 nm and not greater than 720 nm) is less than or equal to

TABLE 7

| | | | Example 31 | | Example 32 | | Example 33 | | Example 34 | | Example 35 | |
|---|---|---|---|---|---|---|---|---|---|---|---|---|
| Layer | Material | Physical film thickness [nm] | Refractive index $\lambda$ = 500 nm | Optical film thickness ×$\lambda$ | Refractive index $\lambda$ = 500 nm | Optical film thickness ×$\lambda$ | Refractive index $\lambda$ = 500 nm | Optical film thickness ×$\lambda$ | Refractive index $\lambda$ = 500 nm | Optical film thickness ×$\lambda$ | Refractive index $\lambda$ = 500 nm | Optical film thickness ×$\lambda$ |
| First layer | $ZrO_2$ | 15.83 | 2.0288 | 0.0642 | 2.0504 | 0.0649 | 2.0726 | 0.0656 | 2.0920 | 0.0662 | 2.1264 | 0.0673 |
| Second layer | $SiO_2$ | 19.20 | 1.4776 | 0.0567 | 1.4776 | 0.0567 | 1.4766 | 0.0567 | 1.4776 | 0.0567 | 1.4776 | 0.0567 |
| Third layer | $ZrO_2$ | 52.00 | 2.0288 | 0.2110 | 2.0504 | 0.2132 | 2.0726 | 0.2156 | 2.0920 | 0.2176 | 2.1264 | 0.2211 |
| Fourth layer | $SiO_2$ | 21.83 | 1.4776 | 0.0645 | 1.4776 | 0.0645 | 1.4766 | 0.0645 | 1.4776 | 0.0645 | 1.4776 | 0.0645 |
| Fifth layer | $ZrO_2$ | 21.10 | 2.0288 | 0.0856 | 2.0504 | 0.0856 | 2.0726 | 0.0875 | 2.0920 | 0.0883 | 2.1264 | 0.0897 |
| Sixth layer | $SiO_2$ | 83.44 | 1.4776 | 0.2466 | 1.4776 | 0.2466 | 1.4766 | 0.2466 | 1.4776 | 0.2466 | 1.4776 | 0.2466 |
| Average reflectance [%] of light having wavelengths of 280 to 400 nm | | 2.71 | | 3.19 | | 1.92 | | 2.10 | | 1.88 | | |
| Average reflectance [%] of light having wavelengths of 300 to 400 nm | | 1.66 | | 1.54 | | 1.58 | | 1.39 | | 1.37 | | |
| xy color system | | x | 0.19 | x | 0.19 | x | 0.19 | x | 0.19 | x | 0.19 | |
| | | y | 0.22 | y | 0.22 | y | 0.22 | y | 0.23 | y | 0.24 | |

Total sum of film thicknesses of the first to the fourth layers: 108.86 nm
Sum of film thicknesses of the first and the second layers: 35.03 nm The formation for examples 31 to 35 is the same as the formation for examples 1 to 5. The refractive index ($\lambda$=500 nm) of the $ZrO_2$ layer is changed from 2.0288 to 2.1264 stepwise.

The physical film thickness of the fourth layer is 21.83 nm in each of examples 31 to 35 and is thus greater than or equal to 10 nm and not greater than 22 nm.

Further, the sum of the physical film thicknesses of the first layer and the second layer is 35.03 nm and is thus greater than or equal to 35 nm and not greater than 45 nm.

Moreover, the total sum of the physical film thicknesses of the first layer to the fourth layer is 108.86 nm and is thus greater than or equal to 100 nm and not greater than 110 nm.

While the refractive index ($\lambda$=500 nm) of the $ZrO_2$ layer is gradually increased from 2.0288 to 2.1264 in examples 31

4.0% for all the wavelengths as shown in FIG. 8 or the like, and the reflectance of light in the visible region is also sufficiently reduced.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is reflected light between the convex surface and the concave surface, so that an uncomfortable outer appearance or visibility is prevented.

Figure 9:
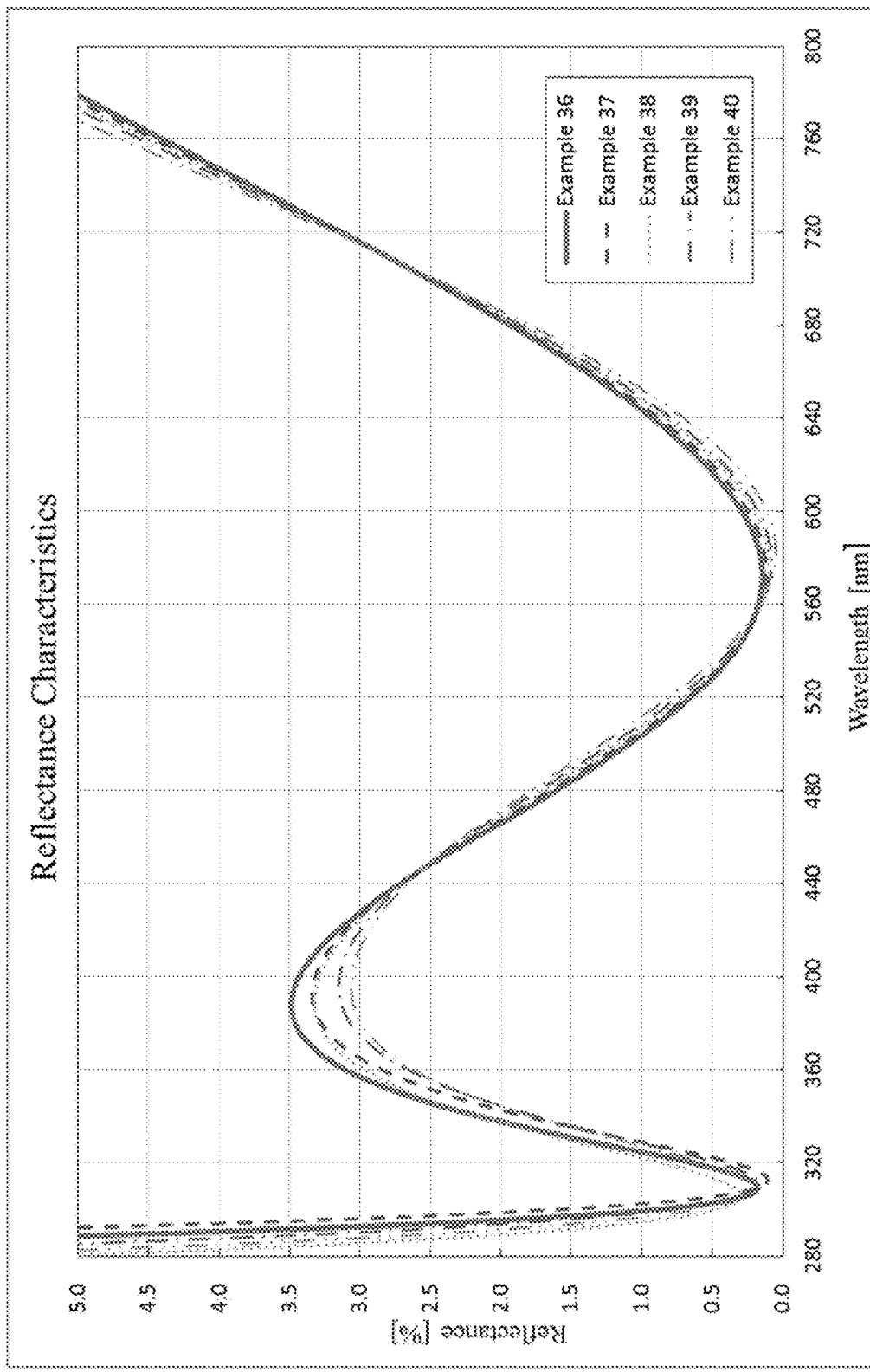
FIG. 9 shows a graph representing a spectral reflectance distribution in the ultraviolet region and the visible region according to examples 36 to 40.

Table 8 indicates film structures, various average reflectances, and x and y values, in the xy color system, of colors of light reflected by the concave surfaces according to examples 36 to 40. FIG. 9 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 36 to 40. FIG. 2(c) shows a graph in which (x, y) values of colors of light reflected by the concave surfaces of examples 36 to 40 are plotted based on the xy-coordinate in the xy color system.

TABLE 8

| | | | Violet | | | | | | | | |
|---|---|---|---|---|---|---|---|---|---|---|---|
| | | | Example 36 | | Example 37 | | Example 38 | | Example 39 | | Example 40 | |
| Layer | Material | Physical film thickness [nm] | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ |
| First layer | $ZrO_2$ | 12.00 | 2.0288 | 0.0487 | 2.0504 | 0.0492 | 2.0726 | 0.0497 | 2.0920 | 0.0502 | 2.1264 | 0.0510 |
| Second layer | $SiO_2$ | 23.25 | 1.4776 | 0.0687 | 1.4776 | 0.0687 | 1.4776 | 0.0687 | 1.4776 | 0.0687 | 1.4776 | 0.0687 |
| Third layer | $ZrO_2$ | 60.09 | 2.0288 | 0.2438 | 2.0504 | 0.2464 | 2.0726 | 0.2491 | 2.0920 | 0.2514 | 2.1264 | 0.2556 |
| Fourth layer | $SiO_2$ | 13.00 | 1.4776 | 0.0384 | 1.4776 | 0.0384 | 1.4776 | 0.0384 | 1.4776 | 0.0384 | 1.4776 | 0.0384 |
| Fifth layer | $ZrO_2$ | 22.74 | 2.0288 | 0.0923 | 2.0504 | 0.0933 | 2.0726 | 0.0943 | 2.0920 | 0.0951 | 2.1264 | 0.0967 |
| Sixth layer | $SiO_2$ | 77.25 | 1.4776 | 0.2283 | 1.4776 | 0.2283 | 1.4776 | 0.2283 | 1.4776 | 0.2283 | 1.4776 | 0.2283 |
| Average reflectance [%] of light having wavelengths of 280 to 400 nm | | | 2.75 | | 3.00 | | 2.21 | | 2.22 | | 2.07 | |
| Average reflectance [%] of light having wavelengths of 300 to 400 nm | | | 2.25 | | 2.06 | | 2.21 | | 1.94 | | 1.93 | |
| xy color system | | | x | 0.20 | x | 0.20 | x | 0.19 | x | 0.19 | x | 0.18 |
| | | | y | 0.12 | y | 0.12 | y | 0.12 | y | 0.12 | y | 0.12 |

Total sum of film thicknesses of the first to the fourth layers: 108.34 nm
Sum of film thicknesses of the first and the second layers: 35.25 nm within the above-described range, the average reflectance of light in the ultraviolet region or the reflectance of light in the visible region is more likely to be reduced.

Further, when the lens of each of examples 31 to 35 is used as a spectacle lens, ultraviolet rays incident from the obliquely lateral rear side of a face when wearing the lens, are hardly reflected by the concave surface (rear surface) and can be sufficiently transmitted therethrough, to protect eyes from the ultraviolet rays incident from the obliquely lateral rear side.

In addition, a color of light reflected by the concave surface having the optical multilayer film satisfies (x, y)= (0.19, 0.22 to 0.24) in examples 31 to 35, and represents a (light translucent) blue color in each example.

When an optical multilayer film (antireflection film or the like) that has the light translucent blue color is further formed on the convex surface of the lens base, the lens has reflection prevention properties while protecting the eyes from ultraviolet rays reflected by the lens rear surface. Further, the lens can also prevent a difference in color of The formation for examples 36 to 40 is the same as the formation for examples 1 to 5. The refractive index ($\lambda$=500 nm) of the $ZrO_2$ layer is changed from 2.0288 to 2.1264 stepwise.

The physical film thickness of the fourth layer is 13.00 nm in each of examples 36 to 40 and is thus greater than or equal to 10 nm and not greater than 22 nm.

Further, the sum of the physical film thicknesses of the first layer and the second layer is 35.25 nm and is thus greater than or equal to 35 nm and not greater than 45 nm. Moreover, the total sum of the physical film thicknesses of the first layer to the fourth layer is 108.34 nm and is thus greater than or equal to 100 nm and not greater than 110 nm.

While the refractive index ($\lambda$=500 nm) of the $ZrO_2$ layer is gradually increased from 2.0288 to 2.1264 in examples 36 to 40, the average reflectance of light in the first ultraviolet region is 2.75%, 3.00%, 2.21%, 2.22%, and 2.07% in examples 36 to 40, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 2.25%, 2.06%, 2.21%, 1.94%, and 1.93% in examples 36 to 40, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 36 to 40, the reflectance of light in the visible region (the wavelength is greater than or equal to 400 nm and not greater than 720 nm) is less than or equal to 3.5% for all the wavelengths as shown in FIG. 9 or the like, and the reflectance of light in the visible region is also sufficiently reduced.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 n, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 36 to 40 is used as a spectacle lens, ultraviolet rays incident from the obliquely lateral rear side of a face when wearing the lens, are hardly reflected by the concave surface (rear surface) and can be sufficiently transmitted therethrough, to protect eyes from the ultraviolet rays incident from the obliquely lateral rear side.

In addition, a color of light reflected by the concave surface having the optical multilayer film satisfies (x, y)= (0.18 to 0.20, 0.12) in examples 36 to 40, and represents a (light translucent) purple color in each example.

When an optical multilayer film (antireflection film or the like) that has the light translucent purple color is further formed on the convex surface of the lens base, the lens has reflection prevention properties while protecting the eyes from ultraviolet rays reflected by the lens rear surface. Further, the lens can also prevent a difference in color of reflected light between the convex surface and the concave surface, so that an uncomfortable outer appearance or visibility is prevented.

Figure 10:
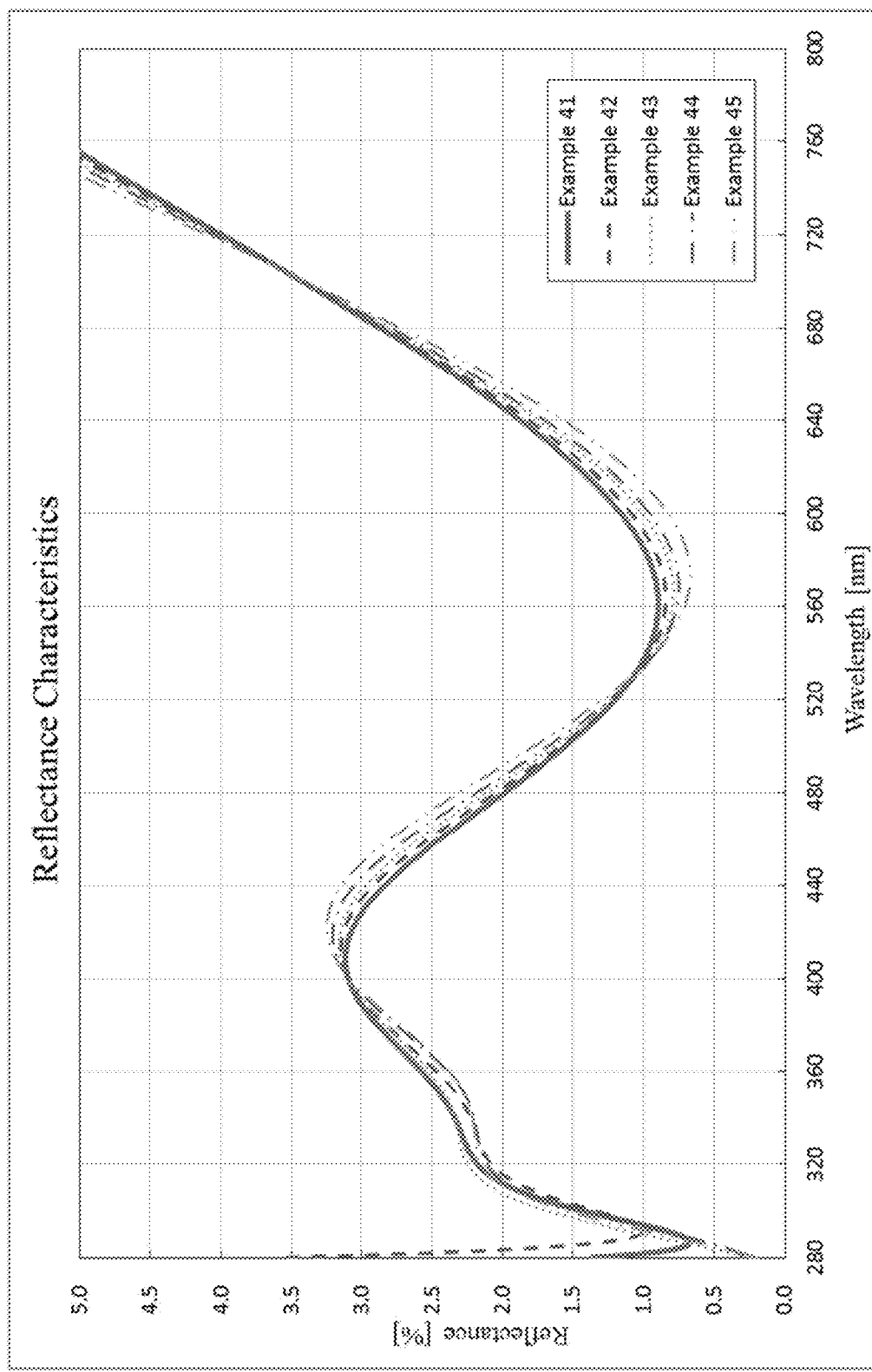
FIG. 10 shows a graph representing a spectral reflectance distribution in the ultraviolet region and the visible region according to examples 41 to 45.

Table 9 indicates film structures, various average reflectances, and x and y values, in the xy color system, of colors of light reflected by the concave surfaces according to examples 41 to 45. FIG. 10 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 41 to 45. FIG. 2(d) shows a graph in which (x, y) values of colors of light reflected by the concave surfaces of examples 41 to 45 are plotted based on the xy-coordinate in the xy color system.

TABLE 9

| | | | Pink | | | | | | | | | |
|---|---|---|---|---|---|---|---|---|---|---|---|---|
| | | | Example 41 | | Example 42 | | Example 43 | | Example 44 | | Example 45 | |
| Layer | Material | Physical film thickness [nm] | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ |
| First layer | $ZrO_2$ | 15.87 | 2.0288 | 0.0644 | 2.0504 | 0.0651 | 2.0726 | 0.0658 | 2.0920 | 0.0664 | 2.1264 | 0.0675 |
| Second layer | $SiO_2$ | 20.00 | 1.4776 | 0.0591 | 1.4776 | 0.0591 | 1.4776 | 0.0591 | 1.4766 | 0.0591 | 1.4776 | 0.0591 |
| Third layer | $ZrO_2$ | 43.71 | 2.0288 | 0.1774 | 2.0504 | 0.1792 | 2.0726 | 0.1812 | 2.0920 | 0.1829 | 2.1264 | 0.1859 |
| Fourth layer | $SiO_2$ | 21.10 | 1.4776 | 0.0624 | 1.4766 | 0.0624 | 1.4776 | 0.0624 | 1.4766 | 0.0624 | 1.4776 | 0.0624 |
| Fifth layer | $ZrO_2$ | 21.68 | 2.0288 | 0.0880 | 2.0504 | 0.0889 | 2.0726 | 0.0899 | 2.0920 | 0.0907 | 2.1264 | 0.0922 |
| Sixth layer | $SiO_2$ | 66.38 | 1.4776 | 0.1962 | 1.4766 | 0.1962 | 1.4776 | 0.1962 | 1.4766 | 0.1962 | 1.4776 | 0.1962 |
| Average reflectance [%] of light having wavelengths of 280 to 400 nm | | | 2.22 | | 2.24 | | 2.23 | | 2.10 | | 2.12 | |
| Average reflectance [%] of light having wavelengths of 300 to 400 nm | | | 2.47 | | 2.38 | | 2.48 | | 2.36 | | 2.37 | |
| xy color system | | | x | 0.27 | x | 0.26 | x | 0.25 | x | 0.25 | x | 0.24 |
| | | | y | 0.21 | y | 0.20 | y | 0.20 | y | 0.19 | y | 0.19 |

Total sum of film thicknesses of the first to the fourth layers: 100.68 nm
Sum of film thicknesses of the first and the second layers: 35.87 nm The formation for examples 41 to 45 is the same as the formation for examples 1 to 5. The refractive index (λ=500 nm) of the ZrO$_2$ layer is changed from 2.0288 to 2.1264 stepwise.

The physical film thickness of the fourth layer is 21.10 nm in each of examples 41 to 45 and is thus greater than or equal to 10 nm and not greater than 22 nm.

Further, the sum of the physical film thicknesses of the first layer and the second layer is 35.87 nm and is thus greater than or equal to 35 nm and not greater than 45 nm.

Moreover, the total sum of the physical film thicknesses of the first layer to the fourth layer is 100.68 nm and is thus greater than or equal to 100 nm and not greater than 110 nm.

While the refractive index (λ=500 nm) of the ZrO$_2$ layer is gradually increased from 2.0288 to 2.1264 in examples 41 to 45, the average reflectance of light in the first ultraviolet region is 2.22%, 2.24%, 2.23%, 2.10%, and 2.12% in examples 41 to 45, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 2.47%, 2.38%, 2.48%, 2.36%, and 2.37% in examples 41 to 45, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 41 to 45, the reflectance of light in the visible region (the wavelength is greater than or equal to 400 nm and not greater than 720 nm) is less than or equal to 4% for all the wavelengths, and the reflectance of light in the visible region (the wavelength is greater than or equal to 400 nm and not greater than 700 nm) is less than or equal to 3.5% for all the wavelengths, as shown in FIG. 10 or the like, and the reflectance of light in the visible region is also sufficiently reduced.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 41 to 45 is used as a spectacle lens, ultraviolet rays incident from the obliquely lateral rear side of a face when wearing the lens, are hardly reflected by the concave surface (rear surface) and can be sufficiently transmitted therethrough, to protect eyes from the ultraviolet rays incident from the obliquely lateral rear side.

In addition, a color of light reflected by the concave surface having the optical multilayer film satisfies (x, y)= (0.24 to 0.27, 0.19 to 0.21) in examples 41 to 45, and represents a (light translucent) pink color in each example.

When an optical multilayer film (antireflection film or the like) that has the light translucent pink color is further formed on the convex surface of the lens base, the lens has reflection prevention properties while protecting the eyes from ultraviolet rays reflected by the lens rear surface. Further, the lens can also prevent a difference in color of reflected light between the convex surface and the concave surface, so that an uncomfortable outer appearance or visibility is prevented.

Figure 2:
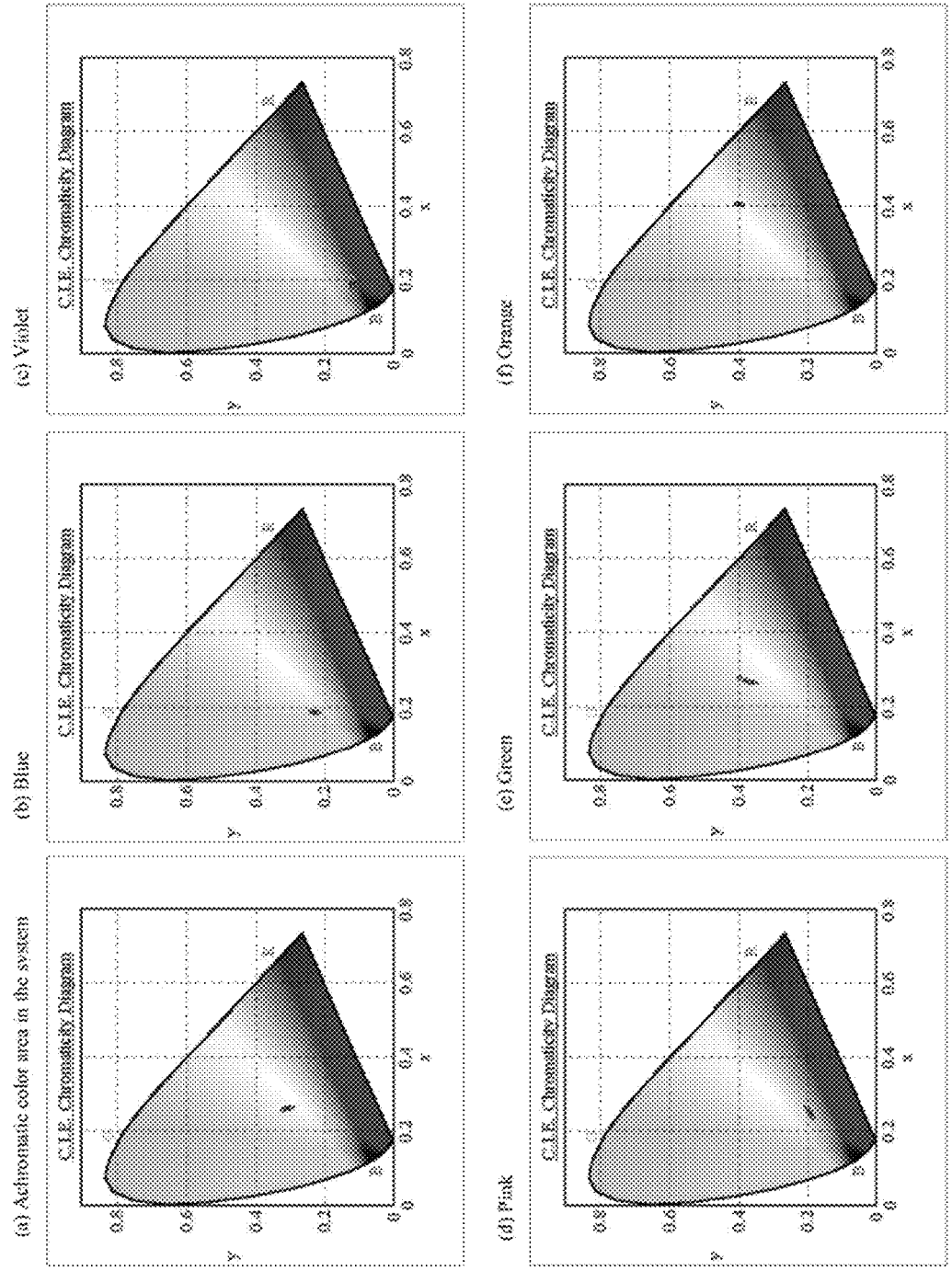
FIG. 2 shows graphs in which (x, y) values of colors of light reflected by concave surfaces are plotted based on the xy-coordinate in the xy color system, and (a) is for examples 1 to 5, (b) is for examples 31 to 35, (c) is for examples 36 to 40, (d) is for examples 41 to 45, (e) is for examples 46 to 50, and (f) is for examples 51 to 55.
Figure 11:
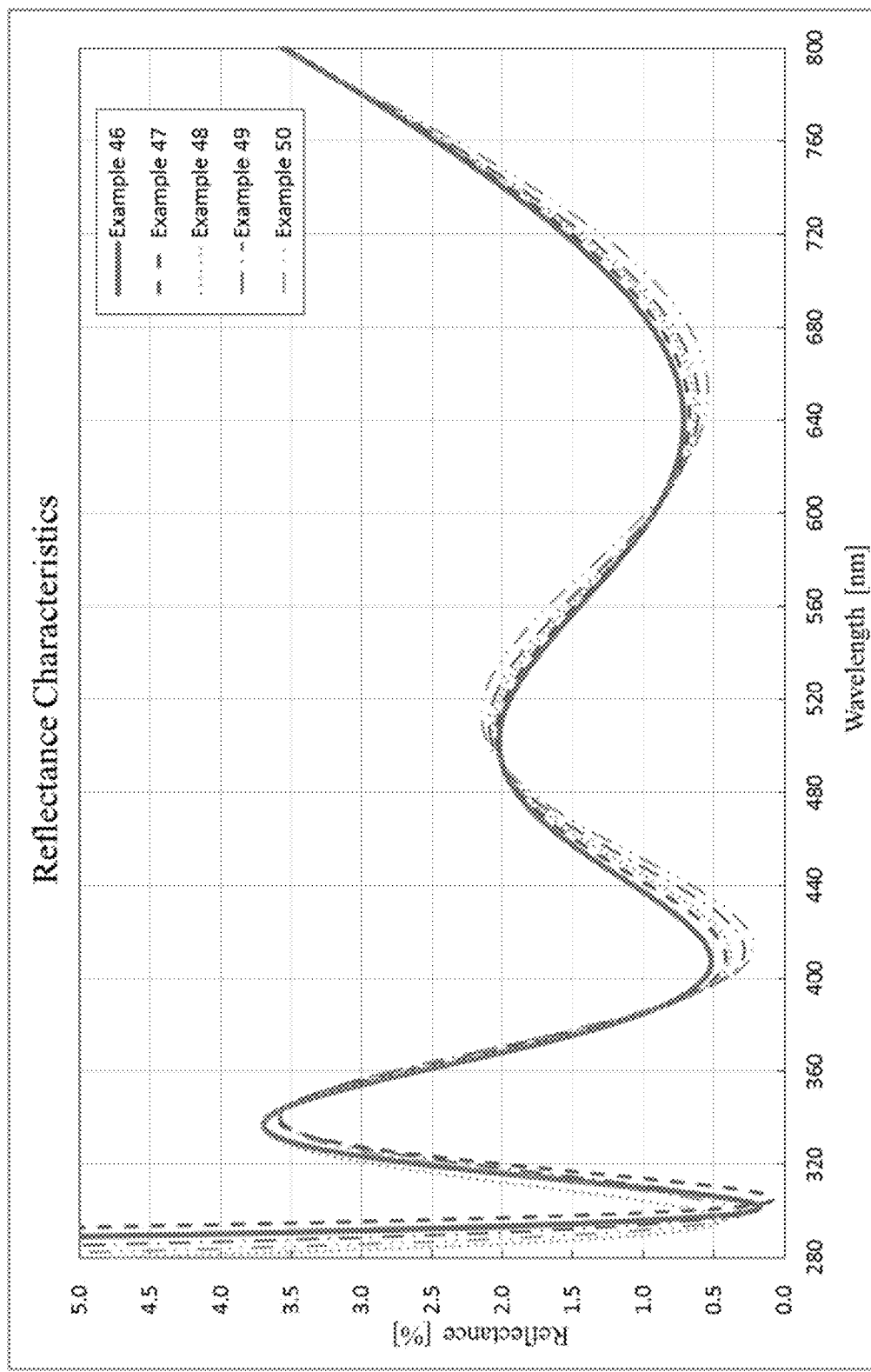
FIG. 11 shows a graph representing a spectral reflectance distribution in the ultraviolet region and the visible region according to examples 46 to 50.

Table 10 indicates film structures, various average reflectances, and x and y values, in the xy color system, of colors of light reflected by the concave surfaces according to examples 46 to 50. FIG. 11 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 46 to 50. FIG. 2(*e*) shows a graph in which (x, y) values of colors of light reflected by the concave surfaces of examples 46 to 50 are plotted based on the xy-coordinate in the xy color system.

TABLE 10

| | | | Green | | | | | | | | | |
|---|---|---|---|---|---|---|---|---|---|---|---|---|
| | | | Example 46 | | Example 47 | | Example 48 | | Example 49 | | Example 50 | |
| Layer | Material | Physical film thickness [nm] | Refractive index λ = 500 nm | Optical film thickness ×λ | Refractive index λ = 500 nm | Optical film thickness ×λ | Refractive index λ = 500 nm | Optical film thickness ×λ | Refractive index λ = 500 nm | Optical film thickness ×λ | Refractive index λ = 500 nm | Optical film thickness ×λ |
| First layer | ZrO$_2$ | 24.09 | 2.0288 | 0.0977 | 2.0504 | 0.0988 | 2.0726 | 0.0999 | 2.0920 | 0.1008 | 2.1264 | 0.1024 |
| Second layer | SiO$_2$ | 17.62 | 1.4776 | 0.0521 | 1.4776 | 0.0521 | 1.4776 | 0.0521 | 1.4776 | 0.0521 | 1.4776 | 0.0521 |
| Third layer | ZrO$_2$ | 49.53 | 2.0288 | 0.2010 | 2.0504 | 0.2031 | 2.0726 | 0.2053 | 2.0920 | 0.2072 | 2.1264 | 0.2106 |

TABLE 10-continued

| | | | Green | | | | | | | | | |
|---|---|---|---|---|---|---|---|---|---|---|---|---|
| | | | Example 46 | | Example 47 | | Example 48 | | Example 49 | | Example 50 | |
| Layer | Material | Physical film thickness [nm] | Refractive index λ = 500 nm | Optical film thickness ×λ | Refractive index λ = 500 nm | Optical film thickness ×λ | Refractive index λ = 500 nm | Optical film thickness ×λ | Refractive index λ = 500 nm | Optical film thickness ×λ | Refractive index λ = 500 nm | Optical film thickness ×λ |
| Fourth layer | SiO$_2$ | 15.01 | 1.4776 | 0.0444 | 1.4776 | 0.0444 | 1.4776 | 0.0444 | 1.4776 | 0.0444 | 1.4776 | 0.0444 |
| Fifth layer | ZrO$_2$ | 27.61 | 2.0288 | 0.1120 | 2.0504 | 0.1132 | 2.0726 | 0.1144 | 2.0920 | 0.1155 | 2.1264 | 0.1174 |
| Sixth layer | SiO$_2$ | 79.44 | 1.4776 | 0.2348 | 1.4776 | 0.2348 | 1.4776 | 0.2348 | 1.4776 | 0.2348 | 1.4776 | 0.2348 |
| Average reflectance [%] of light having wavelengths of 280 to 400 nm | | | 2.78 | | 3.43 | | 2.12 | | 2.25 | | 2.12 | |
| Average reflectance [%] of light having wavelengths of 300 to 400 nm | | | 2.07 | | 1.94 | | 2.22 | | 2.03 | | 2.10 | |
| xy color system | | | x y | 0.26 0.35 | x y | 0.26 0.36 | x y | 0.27 0.37 | x y | 0.27 0.38 | x y | 0.27 0.40 |

Total sum of film thicknesses of the first to the fourth layers: 106.25 nm

The formation for examples 46 to 50 is the same as the formation for examples 1 to 5. The refractive index (λ=500 nm) of the ZrO$_2$ layer is changed from 2.0288 to 2.1264 stepwise.

The physical film thickness of the fourth layer is 15.01 nm in each of examples 46 to 50 and is thus greater than or equal to 10 nm and not greater than 22 nm.

Further, the sum of the physical film thicknesses of the first layer and the second layer is 41.71 nm and is thus greater than or equal to 35 nm and not greater than 45 nm.

Moreover, the total sum of the physical film thicknesses of the first layer to the fourth layer is 106.25 nm and is thus greater than or equal to 100 nm and not greater than 110 nm.

While the refractive index (λ=500 nm) of the ZrO$_2$ layer is gradually increased from 2.0288 to 2.1264 in examples 46 to 50, the average reflectance of light in the first ultraviolet region is 2.78%, 3.43%, 2.12%, 2.25%, and 2.12% in examples 46 to 50, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 2.07%, 1.94%, 2.22%, 2.03%, and 2.10% in examples 46 to 50, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 46 to 50, the reflectance of light in the visible region (the wavelength is greater than or equal to 400 nm and not greater than 720 nm) is less than or equal to 2.5% for all the wavelengths as shown in FIG. 11 or the like, and the reflectance of light in the visible region is also sufficiently reduced.

The reason why the reflection of light in the ultraviolet region and the visible region is prevented as shown in the examples above is considered as follows. That the physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 46 to 50 is used as a spectacle lens, ultraviolet rays incident from the obliquely lateral rear side of a face when wearing the lens, are hardly reflected by the concave surface (rear surface) and can be sufficiently transmitted therethrough, to protect eyes from the ultraviolet rays incident from the obliquely lateral rear side.

In addition, a color of light reflected by the concave surface having the optical multilayer film satisfies (x, y)= (0.26 to 0.27, 0.35 to 0.40) in examples 46 to 50, and represents a (light translucent) green color in each example.

When an optical multilayer film (antireflection film or the like) that has the light translucent green color is further formed on the convex surface of the lens base, the lens has reflection prevention properties while protecting the eyes from ultraviolet rays reflected by the lens rear surface. Further, the lens can also prevent a difference in color of reflected light between the convex surface and the concave surface, so that an uncomfortable outer appearance or visibility is prevented.

Figure 12:
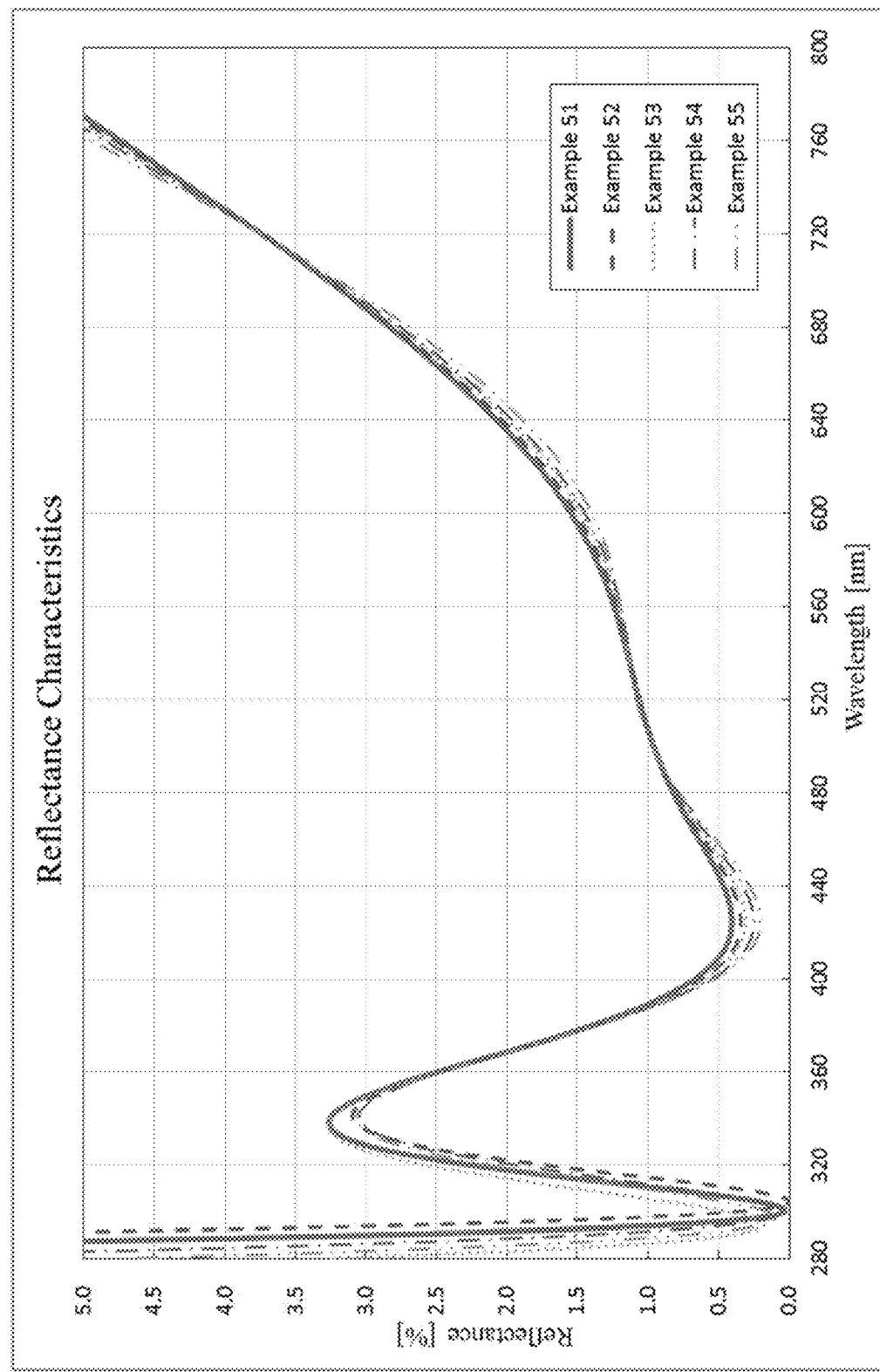
FIG. 12 shows a graph representing a spectral reflectance distribution in the ultraviolet region and the visible region according to examples 51 to 55.

Table 11 indicates film structures, various average reflectances, and x and y values, in the xy color system, of colors of light reflected by the concave surfaces according to examples 51 to 55. FIG. 12 shows a graph representing a spectral reflectance distribution in the ultraviolet region (the wavelength is greater than or equal to 280 nm and less than 400 nm) and in the visible region (the wavelength is greater than or equal to 400 nm and not greater than 800 nm) according to examples 51 to 55. FIG. 2(f) shows a graph in which (x, y) values of colors of light reflected by the concave surfaces of examples 51 to 55 are plotted based on the xy-coordinate in the xy color system.

TABLE 11

| | | | Orange | | | | | | | | | |
|---|---|---|---|---|---|---|---|---|---|---|---|---|
| | | | Example 51 | | Example 52 | | Example 53 | | Example 54 | | Example 55 | |
| Layer | Material | Physical film thickness [nm] | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ | Refractive index $\lambda$ = 500 nm | Optical film thickness $\times\lambda$ |
| First layer | $ZrO_2$ | 18.04 | 2.0288 | 0.0732 | 2.0504 | 0.0740 | 2.0726 | 0.0748 | 2.0920 | 0.0755 | 2.1264 | 0.0767 |
| Second layer | $SiO_2$ | 26.76 | 1.4776 | 0.0791 | 1.4776 | 0.0791 | 1.4776 | 0.0791 | 1.4776 | 0.0791 | 1.4776 | 0.0791 |
| Third layer | $ZrO_2$ | 42.38 | 2.0288 | 0.1720 | 2.0504 | 0.1738 | 2.0726 | 0.1757 | 2.0920 | 0.1773 | 2.1264 | 0.1802 |
| Fourth layer | $SiO_2$ | 13.50 | 1.4776 | 0.0399 | 1.4776 | 0.0399 | 1.4776 | 0.0399 | 1.4776 | 0.0399 | 1.4776 | 0.0399 |
| Fifth layer | $ZrO_2$ | 31.71 | 2.0288 | 0.1287 | 2.0504 | 0.1300 | 2.0726 | 0.1314 | 2.0920 | 0.1327 | 2.1264 | 0.1349 |
| Sixth layer | $SiO_2$ | 74.88 | 1.4776 | 0.2213 | 1.4776 | 0.2213 | 1.4776 | 0.2213 | 1.4776 | 0.2213 | 1.4776 | 0.2213 |
| Average reflectance [%] of light having wavelengths of 280 to 400 nm | | | 2.41 | | 2.94 | | 1.87 | | 1.90 | | 1.79 | |
| Average reflectance [%] of light having wavelengths of 300 to 400 nm | | | 1.94 | | 1.77 | | 2.06 | | 1.81 | | 1.87 | |
| xy color system | | | x | 0.40 | x | 0.40 | x | 0.40 | x | 0.40 | x | 0.40 |
| | | | y | 0.38 | y | 0.39 | y | 0.39 | y | 0.40 | y | 0.41 |

Total sum of film thicknesses of the first to the fourth layers: 100.68 nm
Sum of film thicknesses of the first and the second layers: 44.80 nm The formation for examples 51 to 55 is the same as the formation for examples 1 to 5. The refractive index ($\lambda$=500 nm) of the $ZrO_2$ layer is changed from 2.0288 to 2.1264 stepwise.

The physical film thickness of the fourth layer is 13.50 nm in each of examples 51 to 55 and is thus greater than or equal to 10 nm and not greater than 22 nm.

Further, the sum of the physical film thicknesses of the first layer and the second layer is 44.80 nm and is thus greater than or equal to 35 nm and not greater than 45 nm.

Moreover, the total sum of the physical film thicknesses of the first layer to the fourth layer is 100.68 nm and is thus greater than or equal to 100 nm and not greater than 110 nm.

While the refractive index ($\lambda$=500 nm) of the $ZrO_2$ layer is gradually increased from 2.0288 to 2.1264 in examples 51 to 55, the average reflectance of light in the first ultraviolet region is 2.41%, 2.94%, 1.87%, 1.90%, and 1.79% in examples 51 to 55, respectively. That is, in each example, the average reflectance thereof is reduced so as to be less than or equal to 3.5%, and the reflectance of light in the first ultraviolet region is sufficiently reduced. Further, the reflectance of light in the second ultraviolet region is 1.94%, 1.77%, 2.06%, 1.81%, and 1.87% in examples 51 to 55, respectively. That is, in each example, the reflectance thereof is reduced so as to be less than or equal to 2.5%, and the reflectance of light in the second ultraviolet region is sufficiently reduced. However, in a case where the physical film thickness of the fourth layer is less than 10.00 nm or greater than 22.00 nm, it is difficult to reduce the average reflectance of light in at least one of the ultraviolet regions or the reflectance of light in the visible region to the above-described level, or some influence may be exerted on the reflectance of light in the visible region.

Further, in examples 51 to 55, the reflectance of light in the visible region (the wavelength is greater than or equal to 400 nm and not greater than 720 nm) is less than or equal to 4% for all the wavelengths, and the reflectance of light in the visible region (the wavelength is greater than or equal to 400 nm and not greater than 700 nm) is less than or equal to 3.5% for all the wavelengths as shown in FIG. 12 or the like, and the reflectance of light in the visible region is also sufficiently reduced.

The reason why the reflection of light in the ultraviolet region and the visible region is prevented as shown in the examples above is considered as follows. The physical film thickness of the fourth layer is greater than or equal to 10 nm and not greater than 22 nm, the sum of the physical film thicknesses of the first layer and the second layer is greater than or equal to 35 nm and not greater than 45 nm, and the total sum of the physical film thicknesses of the first layer to the fourth layer is greater than or equal to 100 nm and not greater than 110 nm. When the sum of the physical film thicknesses of the first layer and the second layer is out of the above-described range, it is difficult to reduce the average reflectance of light in at least one of the ultraviolet regions or the reflectance of light in the visible region to the above-described level. Further, even if the sum of the physical film thicknesses of the first layer to the fourth layer is out of the above-described range, when the physical film thickness of the fourth layer is greater than or equal to 10 nm and not greater than 22 nm, and the sum of the physical film thicknesses of the first layer and the second layer is greater than or equal to 35 nm and not greater than 45 nm, the average reflectance of light in the ultraviolet region or the reflectance of light in the visible region can be reduced to the above-described level. However, when the sum of the physical film thicknesses of the first layer to the fourth layer is within the above-described range, the average reflectance of light in the ultraviolet region or the reflectance of light in the visible region is more likely to be reduced.

Further, when the lens of each of examples 51 to 55 is used as a spectacle lens, ultraviolet rays incident from the obliquely lateral rear side of a face when wearing the lens, are hardly reflected by the concave surface (rear surface) and can be sufficiently transmitted therethrough, to protect eyes from the ultraviolet rays incident from the obliquely lateral rear side.

In addition, a color of light reflected by the concave surface having the optical multilayer film satisfies (x, y)= (0.40, 0.38 to 0.41) in examples 51 to 55, and represents a (light translucent) orange color in each example.

When an optical multilayer film (antireflection film or the like) that has the light translucent orange color is further formed on the convex surface of the lens base, the lens has reflection prevention properties while protecting the eyes from ultraviolet rays reflected by the lens rear surface. Further, the lens can also prevent a difference in color of reflected light between the convex surface and the concave surface, so that an uncomfortable outer appearance or visibility is prevented When the physical film thickness of the fourth layer is greater than or equal to 10 nm and not greater than 22 am, and the sum of the physical film thicknesses of the first layer and the second layer is greater than or equal to 35 am and not greater than 45 nm, reflection of light in the visible region is sufficiently reduced and the average reflectance of light in the first ultraviolet region in which the wavelength is greater than or equal to 280 nm and less than 400 nm is also reduced so as to be less than or equal to 3.5%, and the average reflectance of light in the second ultraviolet region in which the wavelength is greater than or equal to 300 nm and less than 400 nm is also reduced so as to be less than or equal to 2.5%, regardless of a color of light reflected by the concave surface, whereby reflection of the ultraviolet rays on the concave surface side can be sufficiently reduced.

Further, when the total sum of the physical film thicknesses of the first layer to the fourth layer is greater than or equal to 100 nm and not greater than 110 nm, reflection of light in the visible region and the ultraviolet region by the concave surface can be further reduced.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An optical product comprising:
   a base having a convex surface and a concave surface; and
   an optical multilayer film formed on at least the concave surface of the base;
   wherein the optical multilayer film has, in total, six layers in which a first layer is closest to the base, and a layer formed of zirconium dioxide and a layer formed of silicon dioxide are alternately layered such that the first layer is the layer formed of zirconium dioxide;
   wherein a physical film thickness of a fourth layer, which is the layer formed of silicon dioxide, is greater than or equal to 10 nm and not greater than 22 nm; and
   wherein a sum of physical film thicknesses of the first layer, which is the layer formed of zirconium dioxide, and a second layer, which is the layer formed of silicon dioxide, is greater than or equal to 35 nm and not greater than 45 nm; and
   wherein a sum of physical film thicknesses of the first layer to the fourth layer is greater than or equal to 100 nm and not greater than 110 nm;
   whereby an average reflectance of light in the visible range and in the ultraviolet range is reduced, so that the average reflectance of light in the ultraviolet range having wavelengths that are greater than or equal to 280 nm and less than 400 nm is less than or equal to 3.5% at the concave surface, and the average reflectance of light in the visible region having wavelengths of greater than 400 nm and 720 nm or less is less than or equal to 2.5%.

2. The optical product according to claim 1, wherein the average reflectance of light in the ultraviolet range having wavelengths that are greater than or equal to 300 nm and less than 400 nm is less than or equal to 2.5% at the concave surface.

3. A spectacle lens comprising the optical product according to claim 1, wherein the base is a spectacle lens base.

* * * * *

UNITED STATES PATENT AND TRADEMARK OFFICE
CERTIFICATE OF CORRECTION

PATENT NO. : 10,101,502 B2
APPLICATION NO. : 14/994490
DATED : October 16, 2018
INVENTOR(S) : Hirotoshi Takahashi Page 1 of 1

It is certified that error appears in the above-identified patent and that said Letters Patent is hereby corrected as shown below:

On the Title Page

Item (56), Other Publications
Please add: "Extended European Search Report (Application No. 14841218.2) dated July 12, 2016."

Signed and Sealed this
Twenty-sixth Day of March, 2019

Andrei Iancu
*Director of the United States Patent and Trademark Office*